United States Patent
Koka et al.

(10) Patent No.: US 9,081,706 B2
(45) Date of Patent: Jul. 14, 2015

(54) USING A SHARED LAST-LEVEL TLB TO REDUCE ADDRESS-TRANSLATION LATENCY

(75) Inventors: Pranay Koka, Austin, TX (US); Michael O. McCracken, Austin, TX (US); Herbert D. Schwetman, Jr., Austin, TX (US); David A. Munday, Santa Cruz, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 236 days.

(21) Appl. No.: 13/468,904

(22) Filed: May 10, 2012

(65) Prior Publication Data

US 2014/0052917 A1 Feb. 20, 2014

(51) Int. Cl.
*G06F 3/03* (2006.01)
*G06F 12/10* (2006.01)
*G06F 12/08* (2006.01)

(52) U.S. Cl.
CPC ........ *G06F 12/1027* (2013.01); *G06F 12/0811* (2013.01); *G06F 2212/681* (2013.01)

(58) Field of Classification Search
CPC .............. G06F 12/1027; G06F 12/145; G06F 2212/681; G06F 12/1009; G06F 12/1036; G06F 12/109; G06F 2212/682; G06F 2212/684; G06F 2212/206; G06F 12/0817; G06F 12/10
See application file for complete search history.

(56) References Cited

U.S. PATENT DOCUMENTS

| | | | | |
|---|---|---|---|---|
| 5,438,663 | A * | 8/1995 | Matsumoto et al. | 711/205 |
| 5,546,555 | A * | 8/1996 | Horstmann et al. | 711/207 |
| 6,324,634 | B1 * | 11/2001 | Yoshioka et al. | 711/205 |
| 7,669,011 | B2 * | 2/2010 | Conway | 711/146 |
| 8,095,771 | B2 * | 1/2012 | Sheu et al. | 711/203 |
| 8,156,307 | B2 * | 4/2012 | Wallach et al. | 711/203 |
| 8,364,932 | B2 * | 1/2013 | Ali et al. | 711/206 |
| 2009/0055596 | A1 * | 2/2009 | Wallach et al. | 711/141 |
| 2011/0022818 | A1 * | 1/2011 | Kegel et al. | 711/206 |
| 2013/0031332 | A1 * | 1/2013 | Bryant et al. | 711/207 |
| 2013/0111132 | A1 * | 5/2013 | Zheng et al. | 711/119 |

* cited by examiner

*Primary Examiner* — Matthew Bradley
*Assistant Examiner* — Candice Rankin
(74) *Attorney, Agent, or Firm* — Park, Vaughan, Fleming & Dowler LLP; Mark Spiller

(57) ABSTRACT

The disclosed embodiments provide techniques for reducing address-translation latency and the serialization latency of combined TLB and data cache misses in a coherent shared-memory system. For instance, the last-level TLB structures of two or more multiprocessor nodes can be configured to act together as either a distributed shared last-level TLB or a directory-based shared last-level TLB. Such TLB-sharing techniques increase the total amount of useful translations that are cached by the system, thereby reducing the number of page-table walks and improving performance. Furthermore, a coherent shared-memory system with a shared last-level TLB can be further configured to fuse TLB and cache misses such that some of the latency of data coherence operations is overlapped with address translation and data cache access latencies, thereby further improving the performance of memory operations.

20 Claims, 16 Drawing Sheets

USING A SHARED LAST-LEVEL TLB TO REDUCE ADDRESS-TRANSLATION LATENCY

GOVERNMENT LICENSE RIGHTS

This invention was made with United States Government support under Agreement No. HR0011-08-9-0001 awarded by the Defense Advanced Research Projects Administration (DARPA). The United States Government has certain rights in the invention.

BACKGROUND

1. Field of the Invention

This disclosure generally relates to techniques for reducing latency in shared-memory multiprocessor computer systems. More specifically, this disclosure relates to techniques for reducing address-translation latency and parallelizing translation and coherency operations.

2. Related Art

Computer memory is typically divided into a set of fixed-length blocks called "pages." An operating system can provide a virtual memory abstraction to give a program the impression that it is accessing a contiguous address space that is larger than the actual available physical memory of the underlying computer system. During operation, the operating system and hardware of the computing device translate virtual into physical addresses in the physical memory. These translated physical addresses are then used to access the desired data from the memory hierarchy.

The latency caused by such address translation can significantly impact the performance of shared-memory server systems. Accessing a virtual address typically involves using specialized translation hardware to determine a corresponding physical memory address. This translation hardware often includes a translation lookaside buffer (TLB) which caches page table translation information to improve the speed of virtual address translations. Modern processors use multiple levels of such TLBs to avoid the latency of page table lookups. However, growing workload data-set sizes and an increase in the number of hardware threads that share a TLB increase TLB pressure, thereby resulting in increased TLB miss rates. In modern multiprocessor systems, a miss in a multi-level TLB initiates a page-table walk, which typically involves several DRAM accesses that can take hundreds of clock cycles to complete. In the worst case, a memory instruction first misses in the TLB (e.g., during translation) and then also misses in the cache hierarchy, resulting in an even larger delay.

Hence, what is needed are system structures and techniques for managing virtual address translations and physical address accesses without the above-described problems of existing techniques.

SUMMARY

The disclosed embodiments provide a system that uses a shared last-level TLB to reduce address-translation latency. A shared-memory multiprocessor system partitions the TLB entries for its virtual address space across two or more nodes. A last-level TLB structure in each node is responsible for the TLB entries for a subset of the virtual address space, with the last-level TLB structures of the nodes collectively forming a shared last-level TLB. During operation, a first node determines that one or more local TLB levels miss for a virtual address. The first (requesting) node sends a TLB request to a second node that is responsible for the subset of the virtual address space that includes the virtual address, while in parallel also scheduling a speculative page-table walk for the virtual address. If the last-level TLB structure of the second node indicates that the TLB entry for the virtual address is being cached by the shared last-level TLB, the second node ensures that the TLB entry for the virtual address is sent to the requesting node, and cancels the speculative page-table walk. Otherwise, if the needed TLB entry for the virtual address is not being cached by the shared last-level TLB, the requesting node waits for the completion of the page-table walk.

In some embodiments, the shared last-level TLB is a distributed shared last-level TLB. A last-level TLB structure in each node caches only TLB entries for virtual addresses in the portion of the virtual address space allocated to the given node, and the last-level TLB structure in the second node directly caches TLB entries for the portion of the virtual address space that includes the virtual address.

In some embodiments, when the lookup for the virtual address misses in the last-level TLB structure of the second node and the requesting first node receives a translation for the virtual address from the speculative page-table walk, the requesting node forwards the translation information for the virtual address to the last-level TLB structure of the second node.

In some embodiments, the last-level TLB structure replaces an existing last-level TLB for a node, and hence does not require additional directory structures.

In some embodiments, the shared last-level TLB is a directory-based shared last-level TLB, and the last-level TLB structure for a given node includes a TLB directory which tracks the set of nodes which are currently caching TLB entries for virtual addresses in the portion of the virtual address space allocated to the given node. In such embodiments, the TLB directory of the second node facilitates identifying one or more nodes that are caching the TLB entry for the virtual address with their TLB. For instance, the second node can use the TLB directory to identify a sharing node that is currently caching the TLB entry for the virtual address, and then forward the request to that sharing node. The sharing node then forwards the needed TLB entry to the requesting (first) node.

In some embodiments, the second node determines from its TLB directory that no node is currently caching the TLB entry associated with the virtual address. In such embodiments, the requesting node receives translation information for the virtual address from the speculative page-table walk, and the second node updates its TLB directory to indicate that the first node is caching the TLB entry for the virtual address.

In some embodiments, the nodes of the shared last-level TLB use existing memory coherence networks to share TLB entries. Sharing TLB entries via a shared last-level TLB facilitates increasing the total number of TLB entries that are simultaneously cached (and accessible) by a shared-memory multiprocessor system.

DETAILED DESCRIPTION

Figure 1:
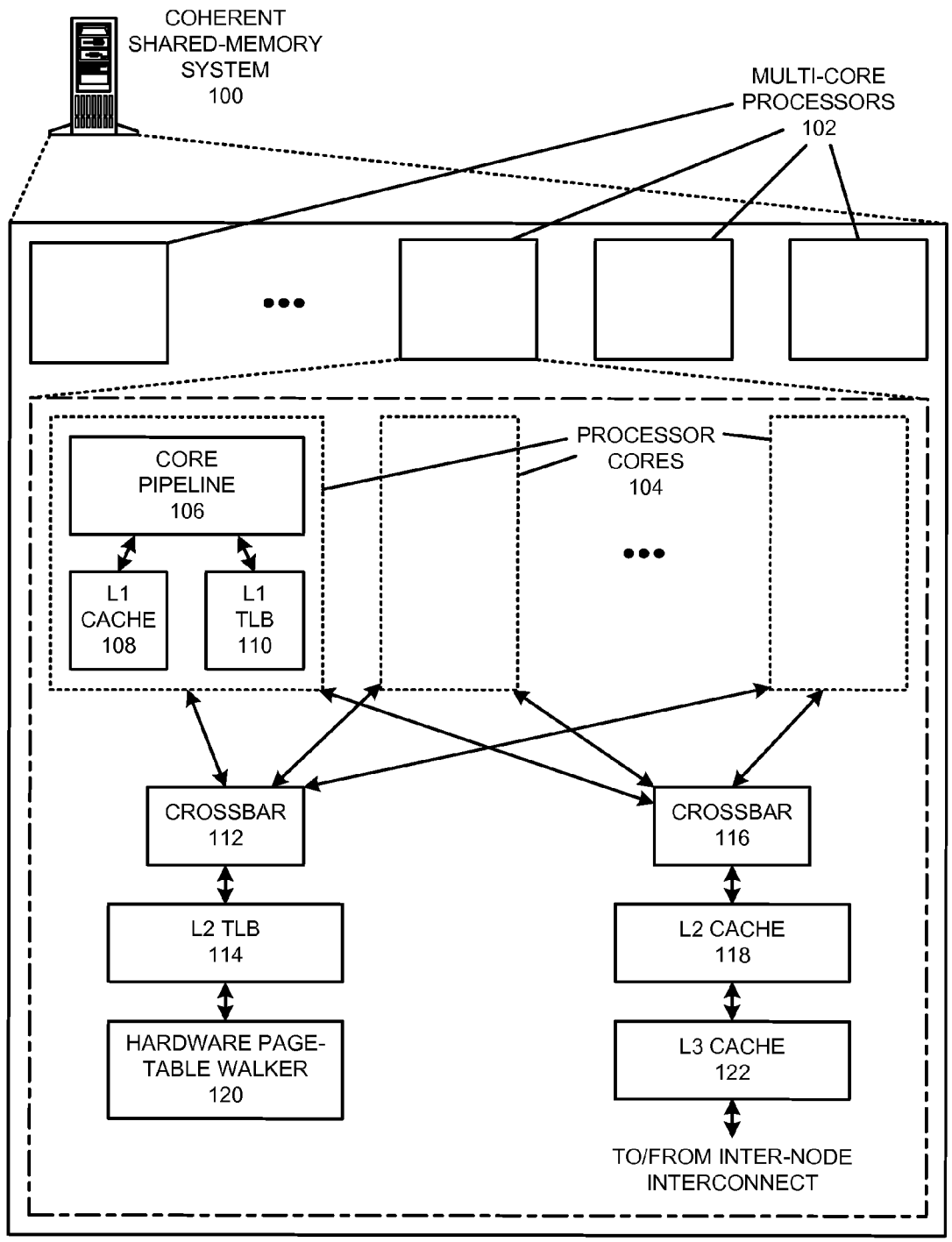
FIG. 1 illustrates an exemplary architecture of one or more multi-core processors in a coherent shared-memory system in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

1. TLB Limitations in Multiprocessor Systems

The latency caused by address translation can significantly impact the performance of shared-memory multiprocessor systems. Modern high-performance multiprocessors typically devote large areas of semiconductor real estate to specialized hardware structures that cache frequently accessed data and speed up address translations. For instance, such specialized hardware structures may include multiple levels of SRAM (or DRAM) caches and multiple levels of translation lookaside buffers (TLBs), which cache page-table translations to avoid the high latency of page-table walks.

However, TLB performance is unfortunately degrading in current systems, and seems likely to continue to degrade in future systems. For instance, growing workload data-set sizes and ongoing increases in the number of hardware threads that share a TLB level increase TLB pressure, thereby increasing TLB miss rates. Furthermore, due to on-chip network and power limitations, future systems are likely to comprise multiple "chiplets" (e.g., small, independent chip multiprocessors that are combined to form a large-scale logically monolithic multiprocessor) interconnected by high performance optical networks. In such designs, a large last-level TLB per chiplet may not be an effective or achievable solution. For example, power and area constraints on a chiplet might not permit a large last-level TLB. Secondly, a large per-chiplet TLB only enables sharing within a given chiplet. In modern multiprocessor systems, a miss in a multi-level TLB initiates a page-table walk, which typically involves several DRAM accesses to read a (typically hierarchical) page table that stores the needed virtual-to-physical address mappings; such DRAM accesses can take hundreds of clock cycles to complete. Because multi-threaded server-class workloads share data among threads, a more desirable solution would involve sharing address translations fetched by other processor cores to reduce the number of page-table walks needed.

Figure 2:
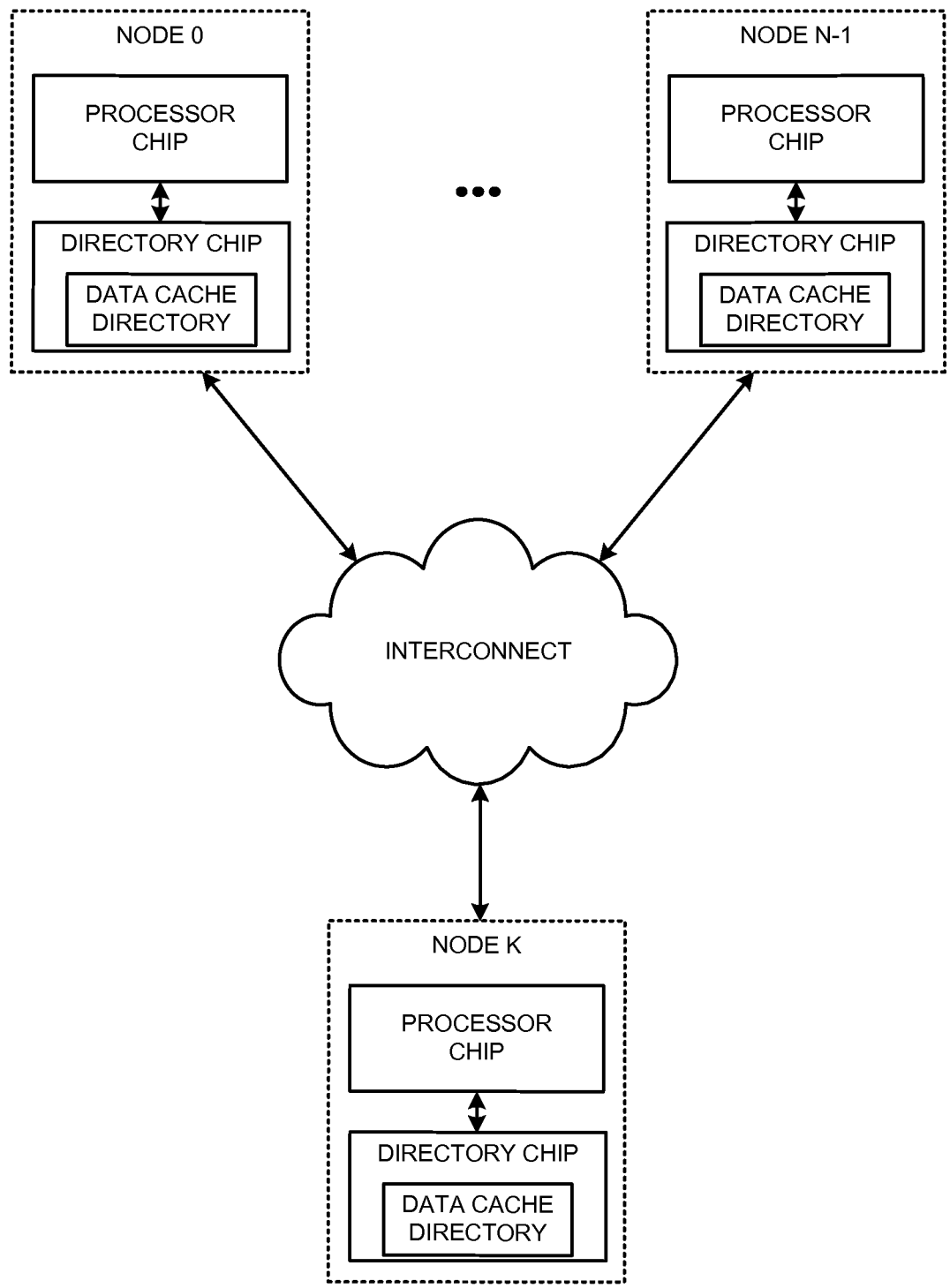
FIG. 2 illustrates a coherent shared-memory system with N multi-core processor nodes in accordance with an embodiment.

FIGS. 1-2 illustrate an exemplary architecture of one or more multi-core processors 102 in a coherent shared-memory (COHSHM) system 100. Multi-core processors 102 illustrate an exemplary processor architecture in which two or more processor cores 104 each includes a core pipeline 106 with a private L1 TLB 110 and L1 cache 108. The processor cores 104 access a shared L2 TLB 114 via one crossbar 112 and access shared L2 118 and L3 122 caches via a second crossbar 116. A hardware page-table walker 120 can access page tables in a shared memory (not shown) when address translations miss in L2 TLB 114. Note that the described concepts are independent of the number of TLB and cache levels in a processor architecture, and can be implemented across a range of different processor architectures.

FIG. 2 illustrates a coherent shared-memory system with N multi-core processor nodes. In some embodiments, each node consists of a processor chip and a directory chip. The physical address space for coherent shared-memory system 100 can be partitioned among the nodes, with each directory chip serving as the "home" (e.g., containing a data cache directory (DC DIR)) for a subset of the physical address space. The DC DIR in a node maintains state for every cache line in its allocated subset that is cached anywhere in the system. A range of coherence protocols (e.g., the MOESI cache coherency protocol) can be used to maintain cache coherence across the nodes. Note that the architecture illustrated in FIG. 2 is exemplary, and that the described techniques are not limited to the illustrated shared-memory systems; the described techniques and structures can be applied to a range of other architectures. For example, the multi-core processor and directory chip (or even multiple processors and directories) may be combined into one hardware unit. Other alternative architectures may include directory chips that are external to the node, and/or have a range of different mappings of physical addresses (or memory pages) to directories and nodes.

Embodiments of the present invention seek to reduce TLB miss rates (and thus reduce the number of page-table walks) by efficiently sharing TLB entries between processor cores and/or chips. For instance, the coherence interconnect of a cache-coherent shared-memory multiprocessor system can be leveraged to facilitate TLB sharing.

2. Techniques for Sharing Last-Level TLBs

In some embodiments, the contents of TLB structures in multiple nodes of a multiprocessor are shared to reduce address-translation latency. For instance, in some embodiments the last-level TLB structures of two or more nodes act together as a distributed shared last-level TLB. In another embodiment, each node includes additional directory structures that allow the last-level TLB structures of two or more nodes to act as a directory-based shared last-level TLB. Enabling TLB sharing between nodes reduces the number of page-table walks, thus improving the execution time of applications. Note that the described techniques also do not require any application software changes.

Figure 3:
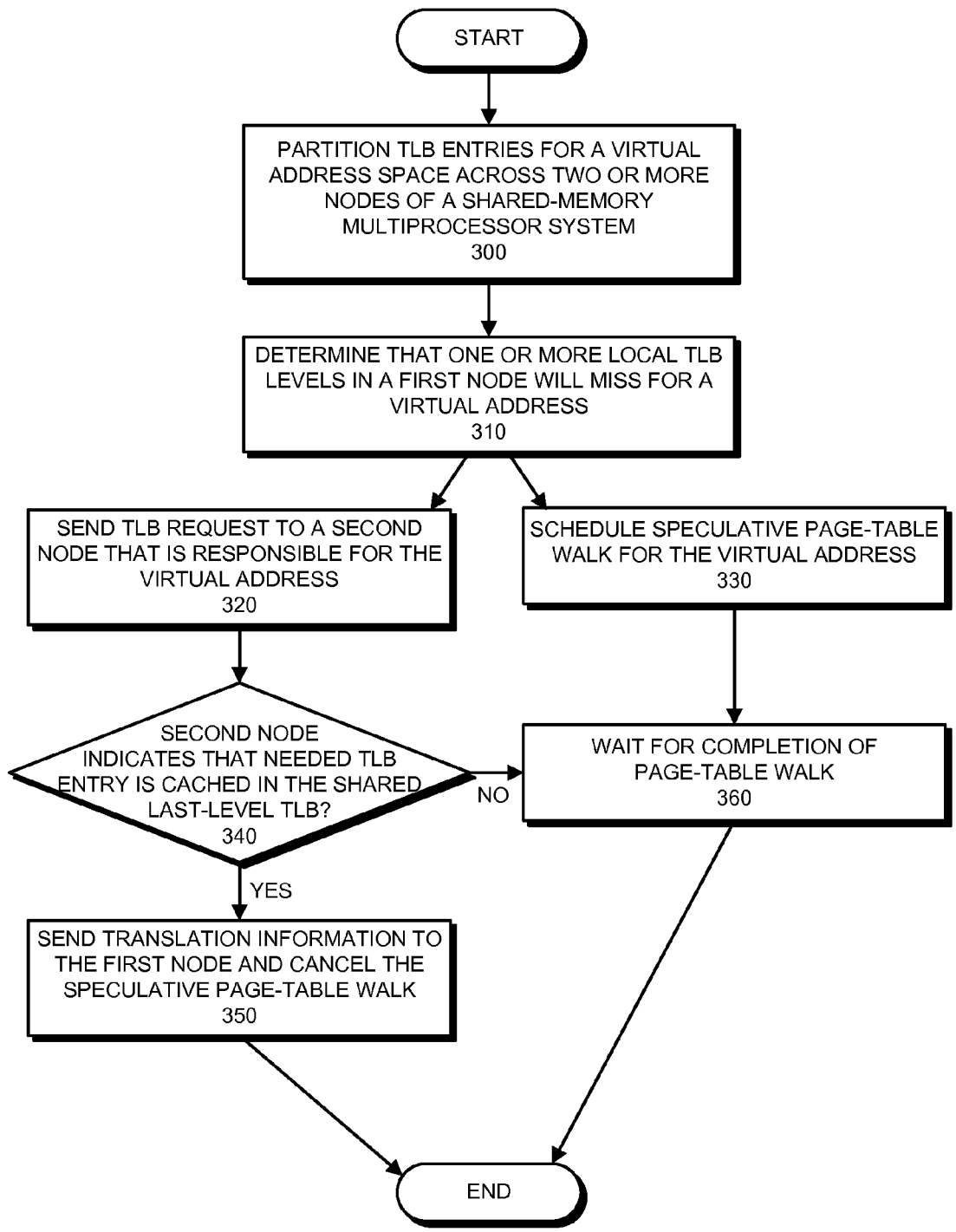
FIG. 3 presents a flow chart illustrating the process of using a shared last-level TLB to reduce address-translation latency in accordance with an embodiment.

FIG. 3 presents a flow chart that illustrates the process of using a shared last-level TLB to reduce address-translation latency. A shared-memory multiprocessor system partitions the TLB entries for its virtual address space across two or more nodes (operation 300). A last-level TLB structure in each node is responsible for the TLB entries for a subset of the virtual address space, with the last-level TLB structures of the nodes collectively forming a shared last-level TLB. During operation, a first node determines that one or more local TLB levels will miss for a virtual address (operation 310). The first node sends a TLB request to a second node that is responsible for the subset of the virtual address space that is associated with the virtual address (operation 320) in parallel with scheduling a speculative page-table walk for the virtual address (operation 330). If the last-level TLB structure of the second node indicates that the TLB entry for the virtual address is being cached by the shared last-level TLB (operation 340), the second node ensures that the TLB entry for the virtual address is sent to the first node (e.g., depending on the shared-TLB architecture, by either sending the TLB entry directly, or instructing another node to do so), and the speculative page-table walk is canceled (operation 350). Otherwise, if the needed TLB entry for the virtual address is not being cached by the shared last-level TLB, the first node instead waits for the completion of the page-table walk (operation 360).

2.1 A Distributed Shared Last-Level TLB

Figure 4:
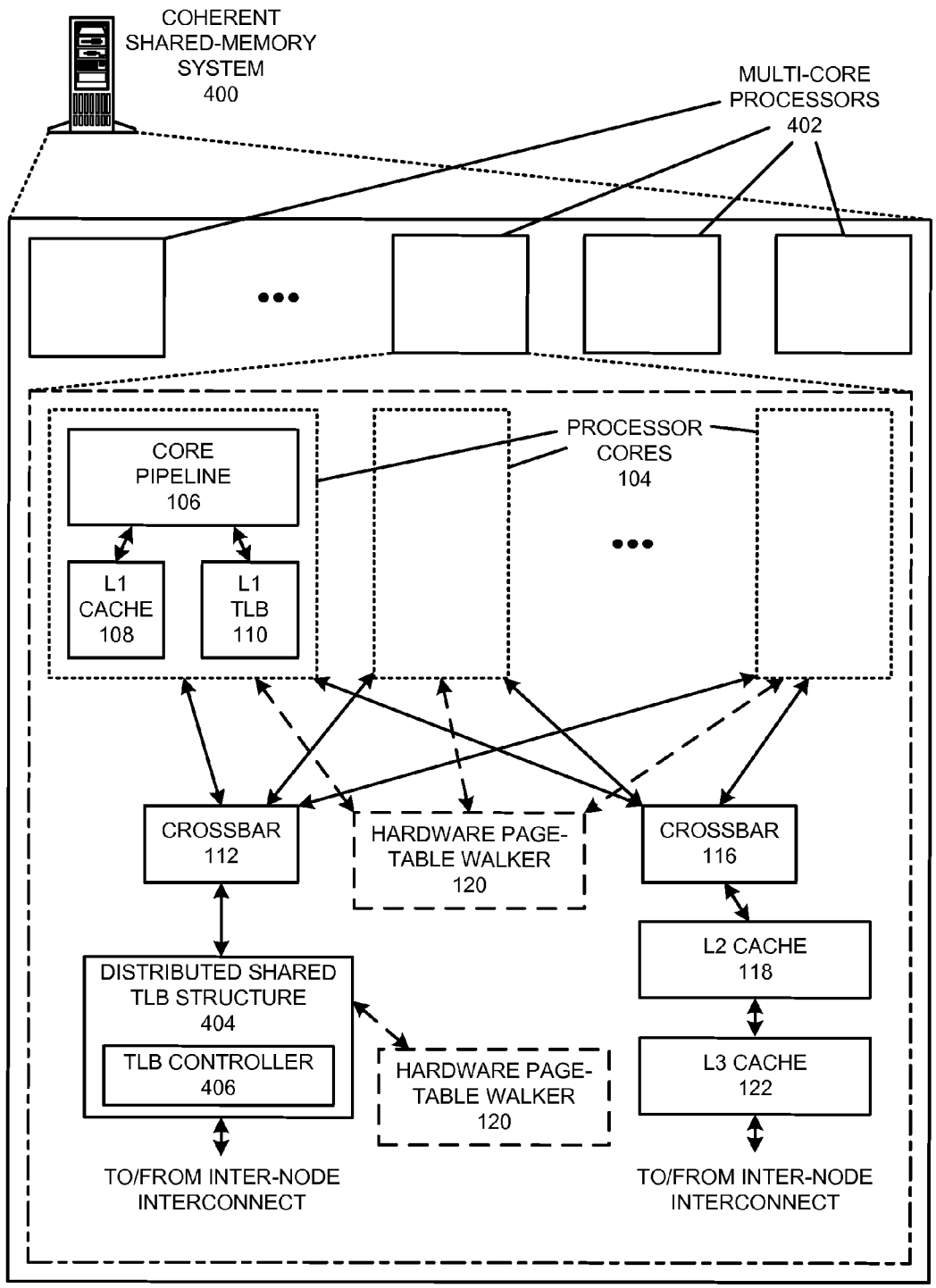
FIG. 4 illustrates an exemplary coherent shared-memory system in which the last-level TLB has been replaced by a specialized distributed, shared TLB structure in accordance with an embodiment.

FIG. 4 illustrates an exemplary coherent shared-memory system 400 in which the last-level (e.g., in this example, an L2) TLB of a multi-core processor 402 has been replaced by a specialized distributed, shared TLB (DST) structure 404. Each of these DST structures 404 includes a TLB controller 406 that enables the last-level TLB structures of two or more multi-core processor nodes 402 to act together as a distributed, shared last-level TLB. The virtual address space for the system is partitioned across these DST structures 404 such that each node is responsible for (e.g., the "virtual address home," or "VA-home," for) the TLB entries for a subset of the virtual address space. The DST structure 404 on a node acts as a last-level TLB, but only caches translations for the virtual pages for which the given node is responsible. Thus, on a higher-level (e.g., L1) TLB miss, a processor core does not access a local lower-level (e.g., L2) TLB, but instead accesses the DST structure 404 on the home node (e.g., the VA-home) for the desired virtual address. Note that these specialized DST structures in each node replace an existing local last-level TLB for a node, and hence do not require additional directory structures; in some embodiments, the DST structures are very similar to a set-associative TLB structure. Note also that the non-last-level TLBs on a node can cache TLB entries from any VA-home; when such TLB entries are flushed from the higher-level TLBs, they can subsequently be re-loaded from the VA-home (or via a page-table walk).

Note that in the architecture illustrated in FIG. 4, the location of hardware page-table walker 120 may vary depending on the implementation. For example, consider a TLB entry managed by a remote VA-home, but not currently cached by either the local node's local higher-level TLBs or the TLB entry's (remote) VA-home. This TLB entry will be retrieved by hardware page-table walker 120, and loaded into one or more higher-level TLBs, and passed on to the VA-home for the associated virtual address as well. In some implementations locating hardware page-table walker 120 closer to processor cores 104 may facilitate rapidly propagating the retrieved TLB entry to a requesting processor core, while in other implementations it may be more beneficial to locate hardware page-table walker 120 closer to the distributed shared TLB structure 404 (e.g., to reduce communication overhead and/or wiring complexity).

Figure 5A:
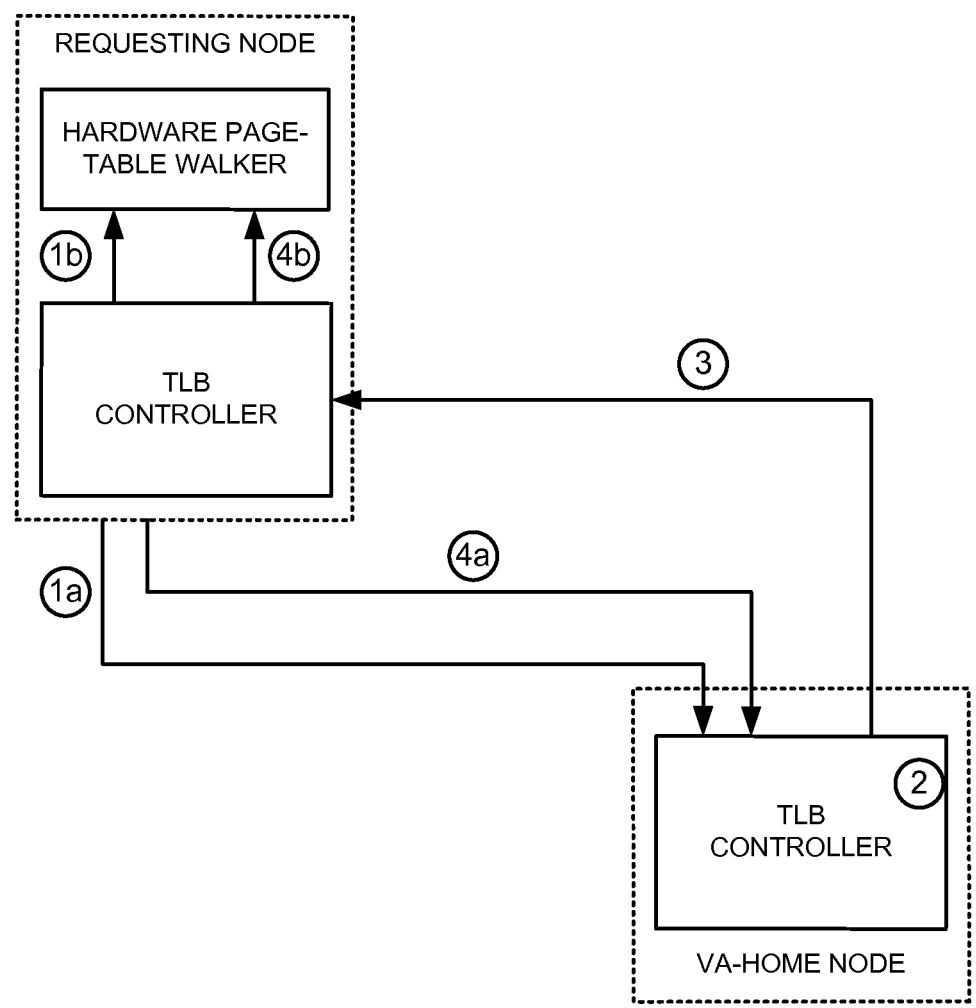
FIG. 5A illustrates the sequence of operations for accessing a TLB entry from a distributed, shared last-level TLB when the TLB entry is found in its VA-home node in accordance with an embodiment.
Figure 5B:
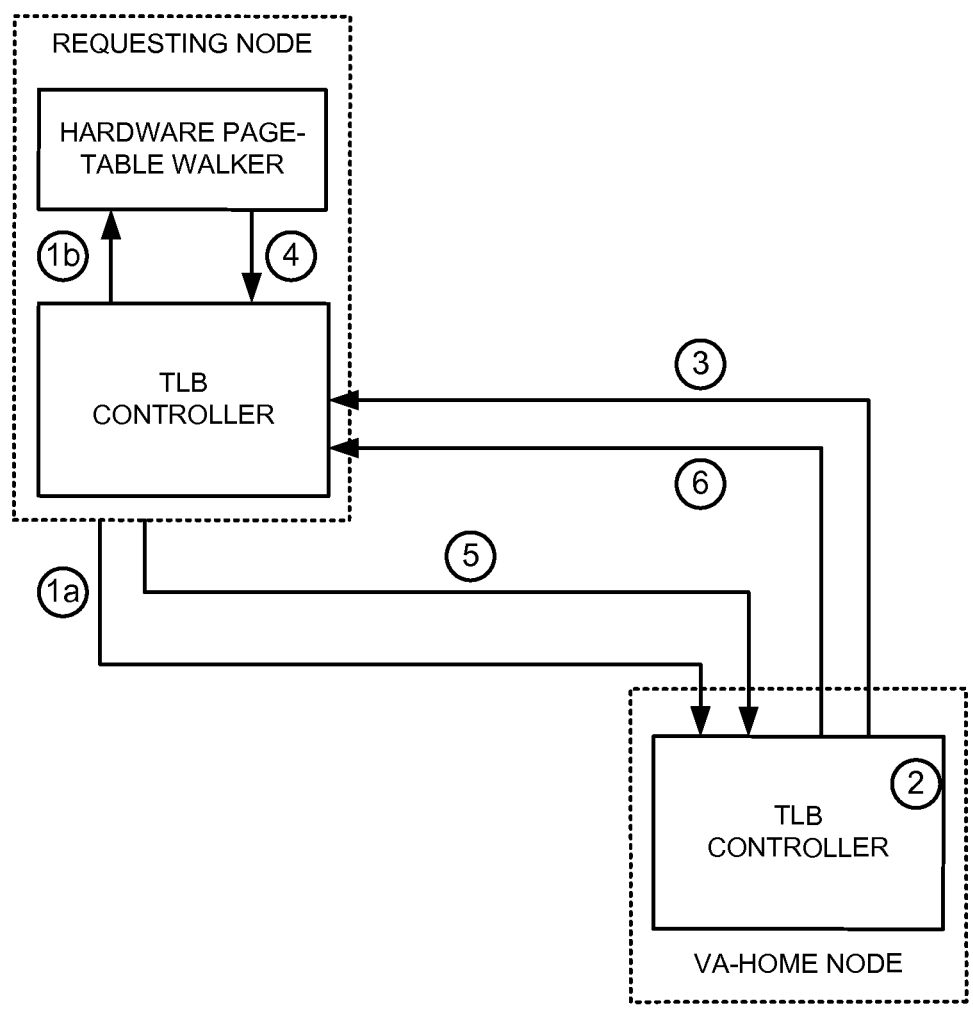
FIG. 5B illustrates the sequence of operations for accessing a TLB entry from a distributed, shared last-level TLB when the TLB entry is not found in its VA-home node in accordance with an embodiment.

FIGS. 5A-5B illustrate the sequence of operations for accessing a TLB entry from a distributed, shared last-level TLB when all of the higher-level TLBs in a requesting node miss for a virtual address. FIG. 5A illustrates a scenario where the translation for the virtual address is found in a DST structure of the virtual address' VA-home node, while FIG. 5B illustrates a scenario where the translation for the virtual address misses in its associated DST structure.

In FIG. 5A, during operation, the TLB controller of a requesting node determines that all of its higher-level TLBs have missed for a virtual address. The TLB controller uses the virtual address (e.g., a set of bits from the virtual address) to determine the VA-home for the virtual address, and sends a TLB request to that VA-home (operation 1a) (or passes the request on to its own DST structure if it determines that it is the VA-home for the virtual address). In parallel, the TLB controller also schedules a speculative page-table walk (operation 1b). The TLB controller in the VA-home node performs a lookup to determine whether the TLB entry needed to perform the virtual-to-physical address translation is currently cached in the DST (operation 2), and sends this information back to the requesting node (operation 3). After receiving the TLB entry, the TLB controller in the receiving node sends an acknowledgment to the VA-home (operation 4a) and cancels the speculative page-table walk (operation 4b). The requesting node can now also load the received translation information into its higher-level TLBs, and perform the needed translation. Note that unless the requesting node is also the VA-home for the virtual address in question, it will not load the TLB entry into its local DST structure.

In FIG. 5B, the TLB controller of the requesting node determines that all of its higher-level TLBs have missed for a virtual address, and sends the TLB request to the VA-home (operation 1a) while scheduling the speculative page-table walk (operation 1b). This time, however, the TLB controller in the VA-home determines that the DST structure misses for the needed TLB entry (operation 2). The VA-home sends a "DST miss" response to the requesting node (operation 3), which then waits for the page-table walk to generate the needed TLB entry (operation 4). The requesting node can use this TLB entry to load the needed translation information into its higher-level TLBs. Additionally, the requesting node forwards the TLB entry to the TLB controller of the VA-home (operation 5), which acknowledges receipt (operation 6) and may cache the TLB entry in its local DST structure. Note that some implementations may omit operation 3 (of FIG. 5B); more specifically, in some implementations, the TLB controller of the VA-home only responds if the needed TLB entry is currently being cached in the DST and thus, in this scenario, does not send a DST miss response. In such implementations, a requesting node that does not receive a positive response (including the TLB entry) from the VA-home just waits for the speculative page-table walk (operation 4) to complete.

The distributed shared last-level TLB effectively serves as a single logical last-level TLB that is physically distributed across all of the nodes of the shared-memory multiprocessor system. This logical structure reduces the number of page-table walks for the multiprocessor system, but may increase the penalty to access translations. For example, TLB entries are only cached in the DST structure of one "home" node; hence, other nodes will incur an additional delay in accessing TLB entries from remote nodes when their local higher-level TLBs miss. However, such additional delays can be reduced by high-speed interconnects; for instance, point-to-point optical interconnects (e.g., without intermediate routers) may substantially reduce such additional delays. Furthermore, even with such additional delays this architecture can be quite effective for workloads that have more "sharing misses" (e.g., misses that are available in the TLBs of other nodes). By not storing duplicate entries in multiple DST structures, the distributed shared last-level TLB can effectively cache a larger set of unique TLB entries. Thus, while the average access delay may increase for hits in the DST (vs. a hit in a local L2 cache), the expected number of page-table walks should decrease substantially for the multiprocessor system, thereby improving overall performance.

2.2 A Directory-Based Shared Last-Level TLB

Figure 6:
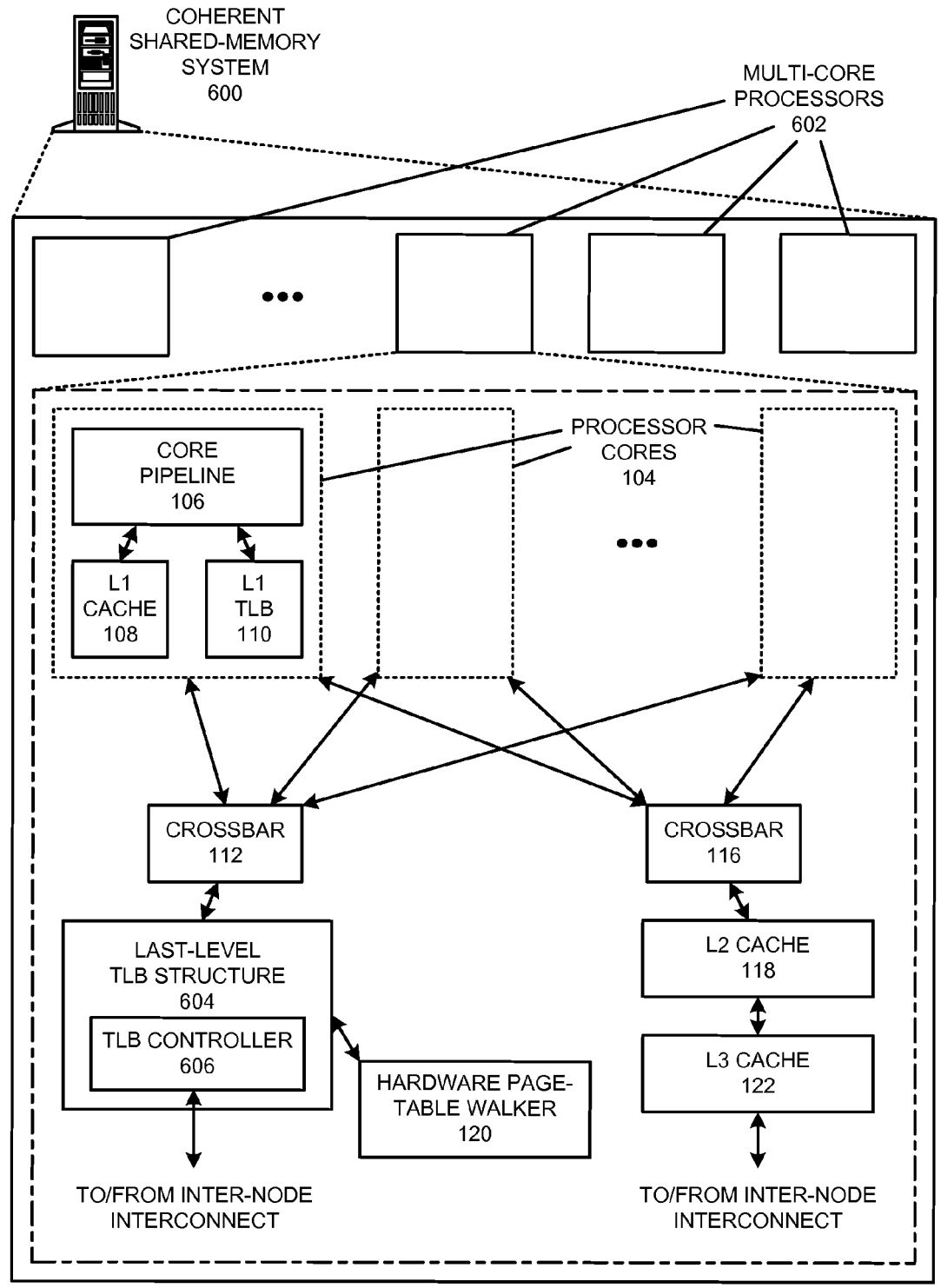
FIG. 6 illustrates an exemplary coherent shared-memory system in which a last-level TLB structure has been augmented to include directory and control structures which enable a directory-based TLB sharing mechanism in accordance with an embodiment.

FIG. 6 illustrates an exemplary coherent shared-memory system 600 in which a last-level (e.g., in this example, an L2) TLB structure 604 of a multi-core processor 602 has been augmented to include directory and control structures which enable a directory-based TLB sharing mechanism. More specifically, the last-level TLB structures 604 of two or more multi-processor nodes can be combined to logically act as a directory-based shared last-level TLB that is substantially similar to a conventional cache coherency mechanism, and hence can use existing cache coherence hardware. The virtual address space for the system is partitioned across these last-level TLB structures 604 such that each node is responsible for (e.g., the VA-home for) tracking the TLB entries for a subset of the virtual address space. However, unlike the system of FIGS. 4-5B, multiple last-level TLB structures 604 may cache the same TLB entry; the VA-home does not exclusively cache TLB entries for its allocated virtual address space, but instead maintains a directory which tracks the set of (zero or more) nodes (including, potentially, the VA-home itself) that are currently caching TLB entries for its allocated virtual address space. Each last-level TLB structure 604 includes a TLB controller 606 that can access a TLB directory structure (not shown in FIG. 6) that stores such additional sharing information. Hence, in coherent shared-memory system 600, a higher-level (e.g., L1) TLB miss results in a normal TLB request to last-level TLB structure 604 (which in this example, includes all of the normal capabilities of an L2 TLB). If, however, this TLB request misses in last-level TLB structure 604, TLB controller 606 initiates a request to the VA-home for the desired virtual address to determine if another node is "sharing" (e.g., caching) the needed TLB entry. These operations are described in greater detail below. Note that the location of the TLB directory structure may vary depending on the implementation; for instance, in some embodiments the TLB directory may be included on a processor chip, while in other embodiments a TLB directory structure may be implemented on a separate directory chip (as illustrated in FIG. 7).

Figure 7:
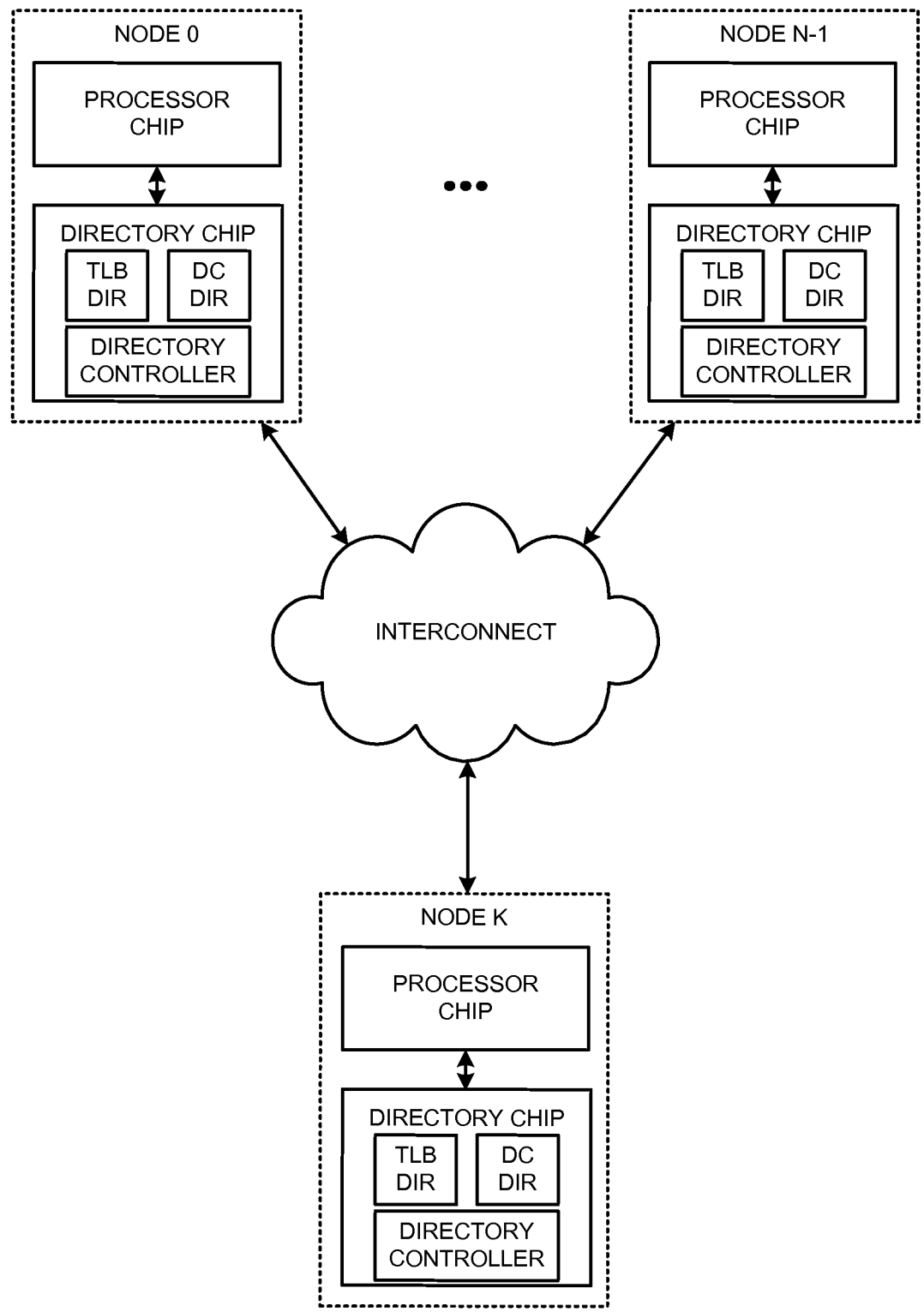
FIG. 7 illustrates an exemplary layout for the exemplary coherent shared-memory system of FIG. 6 in accordance with an embodiment.

FIG. 7 illustrates an exemplary layout for the exemplary coherent shared-memory system 600 of FIG. 6. Coherent shared-memory system 600 comprises N multi-core processor nodes. In some embodiments, each node comprises a processor chip and a directory chip. The physical address space for coherent shared-memory system 600 can be partitioned among the nodes, with each directory chip serving as the "home" (e.g., containing a DC DIR) for a subset of the physical address space. The DC DIR in a node maintains state for every cache line in its allocated subset that is cached anywhere in the system. Similarly, each directory chip includes a TLB directory (TLB DIR) that maintains cache sharing state for every TLB entry in its allocated subset that is cached anywhere in the system. Note that the embodiments illustrated in FIG. 7 are exemplary, and are not limited to the illustrated shared-memory systems; the described techniques and structures can be applied to a range of other architectures. For example, as in FIG. 2, the multi-core processor and directory chip (or even multiple processors and directories) may be combined into one hardware unit. Other alternative architectures may include directory chips that are external to the node, and/or have a range of different mappings of physical or virtual addresses (or memory pages) to directories and nodes. Note also that because the contents of the TLB DIR and the DC DIR may be substantially similar in size, some embodiments may merge the DC DIR and the TLB DIR into a single structure. For the sake of simplicity, these structures are described as separate directories in this description.

Figure 8:
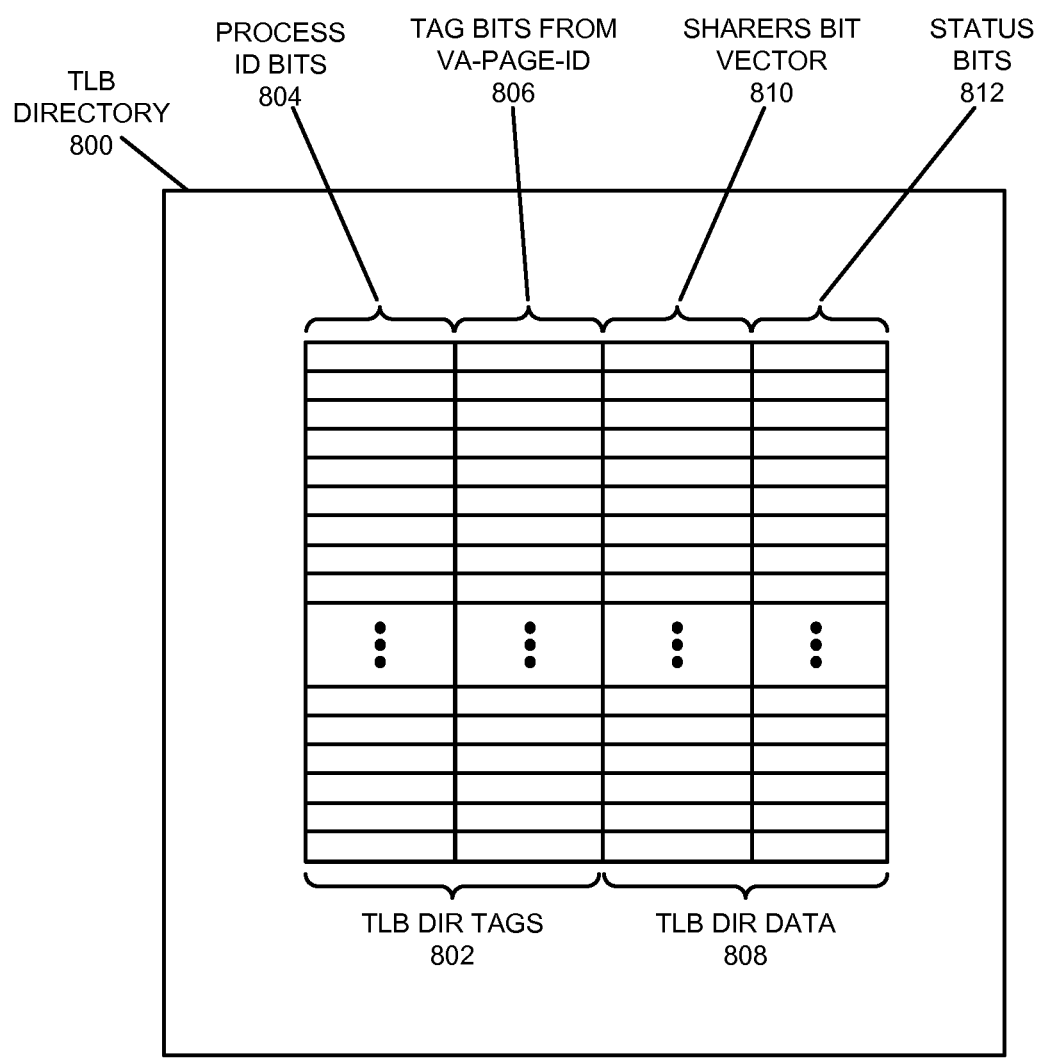
FIG. 8 illustrates an exemplary TLB directory in accordance with an embodiment.

As described above, each last-level TLB structure is now augmented to include and/or access a TLB directory. In some embodiments, this TLB DIR includes a tag array and data array. FIG. 8 illustrates an exemplary TLB directory 800. Each TLB DIR tag 802 comprises bits from a virtual page number 806 and bits from a process ID 804. Each entry in the data array 808 comprises status bits 812 (e.g., a valid bit) and a bit vector that identifies nodes that are sharing a given TLB entry 810.

Figure 9A:
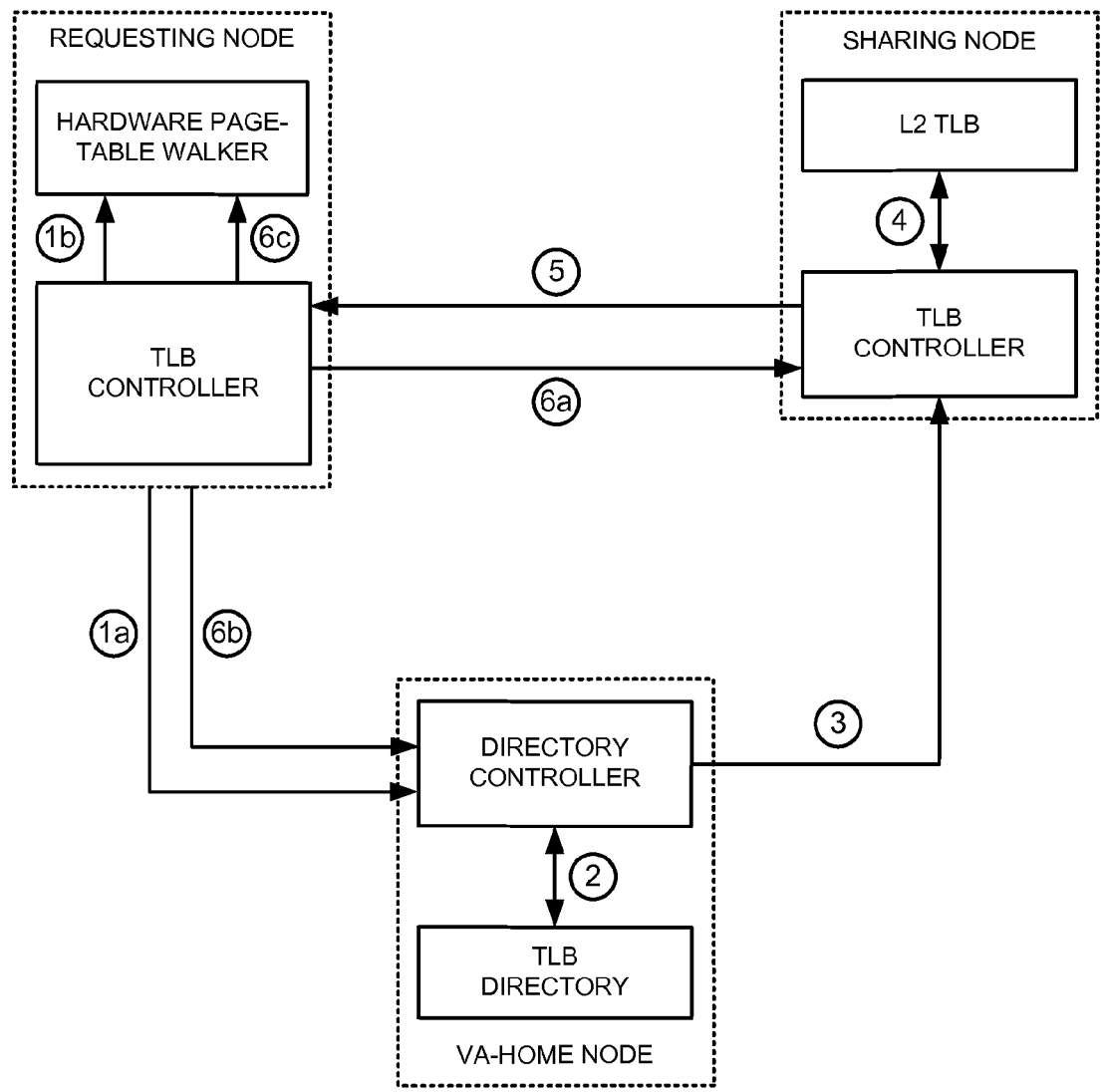
FIG. 9A illustrates the sequence of operations for accessing a TLB entry from a directory-based TLB sharing mechanism when the TLB entry is being cached by one of the nodes of a coherent shared-memory system in accordance with an embodiment.
Figure 9B:
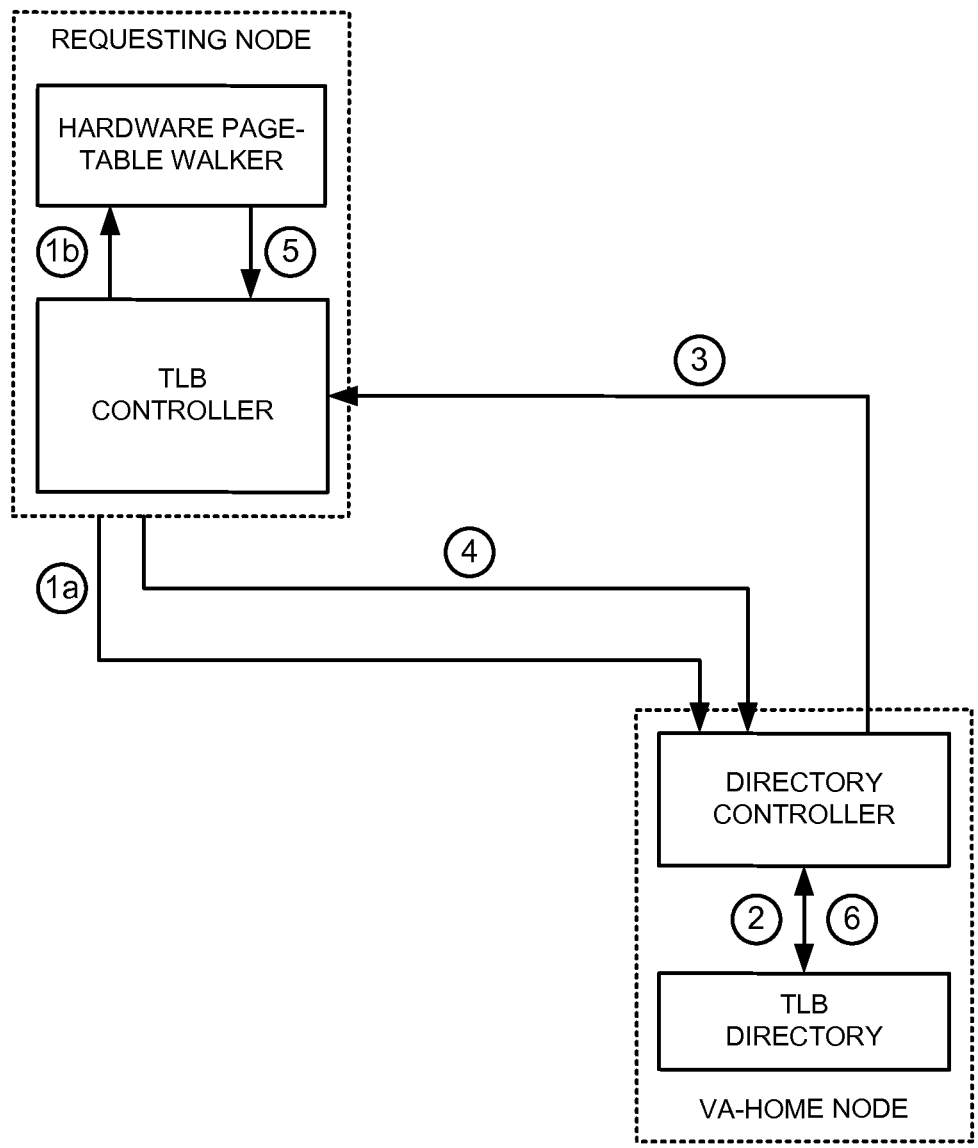
FIG. 9B illustrates the sequence of operations for accessing a TLB entry from a directory-based TLB sharing mechanism when the TLB entry is not currently being cached by any of the nodes of a coherent shared-memory system in accordance with an embodiment.

FIGS. 9A-9B illustrate the sequence of operations for accessing a TLB entry from a directory-based TLB sharing mechanism when all of the TLBs in a requesting node miss for a virtual address. FIG. 9A illustrates a scenario where the TLB entry for the virtual address is being shared (e.g., cached) by another node, while FIG. 9B illustrates a scenario where the translation for the virtual address is not being cached by any nodes in the system.

In FIG. 9A, during operation, the TLB controller of a requesting node determines that all of its local TLBs have missed for a virtual address. The TLB controller uses the virtual address to determine the VA-home for the virtual address, and sends a TLB request to that VA-home (operation 1a). In parallel, the TLB controller also schedules a speculative page-table walk (operation 1b) (e.g., to avoid the latency of a remote directory lookup miss if no other nodes are caching the needed TLB entry). The directory controller in the VA-home node performs a TLB-directory lookup to retrieve the bit-vector of sharers for the page table entry that corresponds to the desired virtual address (operation 2). If the needed TLB entry is being cached by one or more additional nodes, the VA-home can pick one sharing node (e.g., either randomly or by using a range of selection techniques) and send a request to the TLB controller of that node (operation 3). The TLB controller on the sharing node fetches the entry from its last-level (e.g., L2) TLB structure (operation 4), and forwards the TLB entry to the requesting node (operation 5). After receiving the TLB entry, the TLB controller in the requesting node: (1) sends an acknowledgment to the sharing node (operation 6a); sends an acknowledgment to the VA-home (operation 6b), which then updates the TLB directory entry for the TLB entry to indicate that the requesting node is now also caching the TLB entry; and (3) cancels the speculative page-table walk (operation 6c). The requesting node can now also load the received translation information into its TLBs (including its last-level TLB), and perform the needed translation.

In FIG. 9B, the TLB controller of the requesting node determines that all of its TLBs have missed for a virtual address, and sends the TLB request to the VA-home (operation 1a) while scheduling the speculative page-table walk (operation 1b). This time, however, the directory controller in the VA-home determines from the TLB directory that the needed TLB entry is not being cached by any nodes (operation 2). The VA-home sends a "not shared" response to the requesting node (operation 3), which then sends an acknowledgment to the VA-home (operation 4) and waits for the page-table walk to generate the needed TLB entry (operation 5). The requesting node can then load this TLB entry into its local TLBs and perform the needed address translation. Upon receiving the acknowledgment, the VA-home knows that the requesting node will receive (and start caching) the needed TLB entry via the speculative page-table walk, and can update the TLB directory entry for the TLB entry to indicate that the requesting node is now (or will shortly be) caching the TLB entry (operation 6). Note that, to maintain TLB sharing coherency, last-level TLB structures need to notify TLB directories when cached TLB entries are being flushed.

Note also that, as similarly described for FIG. 5B, some implementations may omit operation 3 (of FIG. 9B), and potentially operation 4 as well. More specifically, in some implementations the directory controller does not send a "not shared" response, but instead only responds if the needed TLB entry is currently being cached by a node. In such implementations, a requesting node that does not receive a positive response (including the TLB entry) from a sharing node just waits for the speculative page-table walk (operation 5) to complete. In such implementations, if the requesting node does not receive a "not shared" response from the VA-home, it also does not need to send an acknowledgement, and hence omits operation 4. The VA-home still knows that the requesting node will be receiving the needed TLB entry via the speculative page-table walk, and proceeds with operation 6 after performing the TLB-directory lookup (operation 2).

A directory-based shared last-level TLB allows TLB entries that are managed by remote nodes to be cached in a local last-level TLB instead of only in a remote DST structure. Allowing TLB entries to be cached in the last-level structures of other nodes (instead of only in those of their VA-homes) reduces the number of remote accesses. However, allowing the same TLB entry to be cached in the last-level TLBs of multiple nodes potentially reduces the number of unique TLB entries that are simultaneously being cached in the directory-based shared last-level TLB (in comparison with the previously described distributed, shared last-level TLB). Furthermore, the directory-based shared last-level TLB also has a slightly higher hardware cost (e.g., due to the additional directory structures on each node) and higher average latency for inter-node requests (e.g., requests sent to the VA-home for a virtual address frequently involve an additional interconnect message to a sharing node if the VA-home is not currently caching the desired TLB entry). Hence, this technique may increase the average latency of remote accesses, but also somewhat reduces the likelihood of needing to access translation information remotely.

2.3 Benefits of Shared Last-Level TLBs

The disclosed techniques facilitate sharing TLB translations between cores on the same chip and cores on different chips "on demand" during a TLB miss. Thus, the above-described TLB-sharing techniques are distinct from pre-fetching-based techniques that attempt to track address access patterns to predict future TLB accesses by cores, and then pre-fetch translations for these predicted accesses. Unlike such pre-fetching techniques, the above-described TLB-sharing techniques do not need to perform such tracking, and do not suffer from bandwidth wastage due to false positives. Furthermore, the described sharing techniques use the total system TLB space to store useful translations, without the unnecessary duplication that is often present in pre-fetching techniques.

The above-described TLB-sharing techniques are also distinct from snooping-based techniques. Snooping mechanisms typically use a shared centralized bus that allows each core to read (or "snoop") all other cores' memory/TLB accesses. Some snooping techniques allow capacity sharing among multiple TLBs. For example, capacity sharing can be achieved by having TLBs snoop the miss requests of other TLBs, and moving evicted victims from an evicting TLB to a neighbor TLB (instead of flushing them completely). However, while such snooping techniques can provide some capacity sharing, the centralized bus required by snooping techniques becomes a bottleneck as clock rates and core densities increase, which can present significant scaling challenges.

In contrast, the above-described TLB sharing techniques do not require snooping mechanisms or a centralized bus, and instead use and/or extend existing hardware cache coherence infrastructure (e.g., interconnects, directories, etc). Using existing coherence networks enables the described techniques to scale without the substantial power and complexity penalties traditionally suffered by snooping protocols, and also eliminates the complex sharing metrics and prediction mechanisms that are required to determine when to share or push translations to other TLBs.

In some embodiments, additional TLB requests and coherence traffic may increase the load on the existing coherence networks. These networks are typically packet-based, and the additional TLB requests (or other coherence network traffic) may increase the delay of remote lookups. Thus, in some embodiments, such techniques may also involve re-provisioning such networks to increase bandwidth and routing capabilities and/or switching to optical interconnects. Note also that the increased TLB traffic reduces the number of requests to DRAM; in some embodiments, re-provisioning to balance the load may involve reducing the provisioning for the page-walk infrastructure and shifting the resulting additional available resources to the memory coherence network.

Note that the above-described TLB-sharing techniques are also distinct from other proposed techniques that relate to improving the performance of TLB "shoot-downs" (e.g., managing TLB invalidations). While performing such invalidations in hardware may involve additional directory structures, such operations seek to reduce the overhead involved in invalidating TLB entries. In contrast, the described TLB-sharing techniques strive to improve performance by reducing the number of page-table walks (and thereby reducing the average latency of address translation).

3. Limitations of Serializing TLB and Data Cache Accesses

The previous sections have described techniques to reduce the average latency of TLB misses in shared-memory multiprocessor systems. While these techniques improve address translation performance, the execution of a memory instruction (e.g., a load or store instruction) on a processor involves two steps: (1) virtual-to-physical address translation, and (2) the actual data access from the memory hierarchy (e.g., from caches and/or main memory). Because caches and memory are typically accessed using physical addresses, these two steps are usually serialized. As described above, a TLB miss during address translation can be resolved by accessing a shared last-level TLB (as described above) or, if needed, performing a page-table walk. On a data cache miss, the needed cache line can be obtained either from the cache of a remote processor in a coherent shared memory system or (if the cache line misses in all caches) from a local or remote memory. In the worst case scenario, when a memory instruction first misses in the TLB and then also misses in the cache hierarchy, the sequential nature of the two steps can significantly delay the execution of the memory instruction, thereby negatively affecting application performance.

The following sections consider a TLB miss and subsequent last-level cache miss in an exemplary shared-memory multiprocessor system (e.g., as described for FIGS. 2, 4 and/or 6-7). These exemplary architectures assume private L1 TLBs, a shared last-level TLB, and a three-level cache hierarchy (although the techniques presented can be implemented for any number of cache and TLB levels, and in a range of different processor architectures). As described above, the virtual address space and the physical address space are both partitioned among the nodes, with each node serving as both the VA-home for a subset of the virtual address space and as the "PA-home" (or "physical address home") for a subset of the physical address space. More specifically, the DC DIR in each node maintains state for every cache line in its allocated subset that is cached anywhere in the system. A range of coherence protocols (e.g., the MOESI cache coherency protocol) can be used to maintain cache coherence across the nodes; more specifically, the described techniques can build upon any cache coherence protocol that facilitates maintaining coherence across multiple caches. Note that, as mentioned previously, the architectures illustrated in FIGS. 1-2, 4, and 6-7 are exemplary; the described techniques and structures are not limited to the described shared-memory systems, and can be applied to a range of architectures.

Figure 10A:
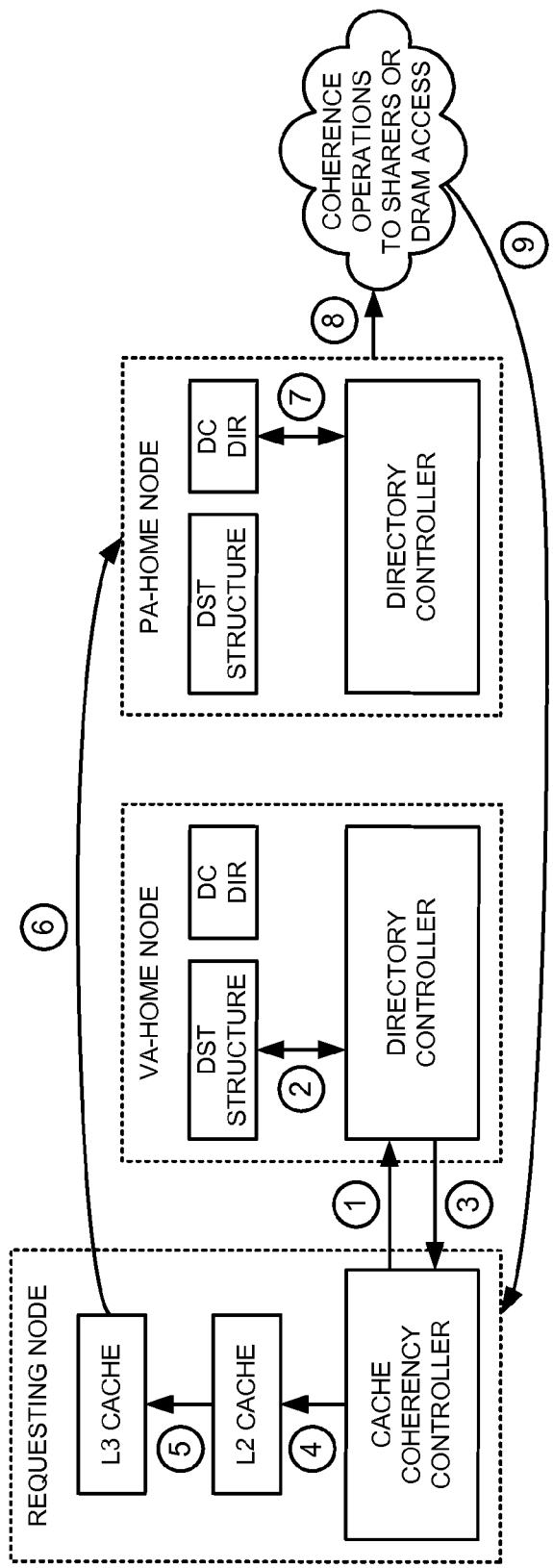
FIG. 10A illustrates the interactions between three nodes of a coherent shared-memory system during a memory operation that misses in both a shared last-level TLB and all of the caches of the requesting node in accordance with an embodiment.
Figure 10B:
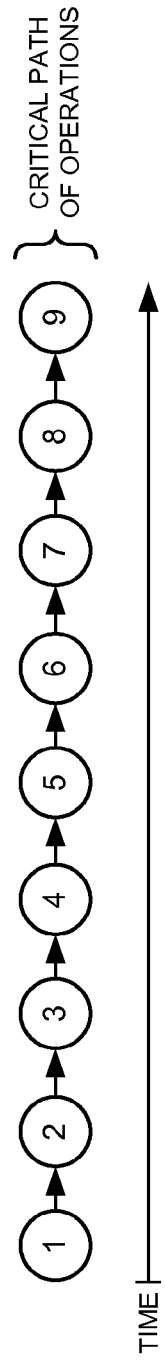
FIG. 10B illustrates the critical path timeline for the interactions of FIG. 10A in accordance with an embodiment.

FIGS. 10A-10B illustrate the sequence of steps involved in completing a memory operation that misses in a shared last-level TLB and then also misses in all of the caches of the requesting node. More specifically, FIG. 10A illustrates the interactions among three nodes of a coherent shared-memory system during the two misses, while FIG. 10B illustrates a timeline of the critical path for these interactions. Note that while each of the three nodes illustrated in FIG. 10A includes the same set of hardware (in this example, the hardware previously described for nodes that support a distributed, shared last-level TLB), for clarity only the node components that are relevant to the current memory operation are illustrated in FIG. 10A.

In FIG. 10A, a requesting node experiences a TLB miss and subsequent cache misses. The requesting node determines that none of its local TLBs includes the needed TLB entry, determines the VA-home for the virtual address, and sends a translation request to the VA-home node (operation 1). The directory controller on the VA-home node retrieves the needed TLB entry from its DST structure (operation 2), and forwards the TLB entry to the requesting node (operation 3). Alternatively, if the needed TLB entry was not cached in the DST structure of the VA-home node, the requesting node would instead need to perform a page-table walk. After performing the address translation, the requesting node looks up the resulting physical address in its local caches. In this example, this data access misses in the cache hierarchy (operations 4 and 5), the cache coherency controller of the requesting node determines that the physical address is a remote-managed address, and the requesting node sends a cache-miss request to the PA-home responsible for the physical address (operation 6). Depending upon the status of the cache line in the DC DIR of the PA-home (operation 7), the cache-miss request can result either in a DRAM access in the PA-home or a sequence of coherence operations (operation 8). As mentioned above, the system can implement a range of the coherence protocols, and hence the details of this operation are not discussed in detail; operation 8 represents all the DRAM or coherence activity needed to fetch the requested cache line, which is then returned to the requesting node (operation 9).

FIG. 10B illustrates how all the steps described for the serialized memory operation of FIG. 10A fall on the critical path. The total latency for the critical path of the memory operation, $T_{critical}$, is:

$$T_{critical} = T_{VA\text{-}reqmsg} + T_{DST} + T_{ret\_trans} + T_{L2} + T_{L3} + T_{PA\text{-}reqmsg} + T_{DCDIR} + T_{coh\_op},$$

where: $T_{VA\text{-}reqmsg}$ is the time needed to send the TLB request message to the VA-home; $T_{DST}$ is the lookup time in the VA-home's DST structure; $T_{ret\_trans}$ is the time needed to return the translation results to the requesting node; $T_{L2}$ and $T_{L3}$ are the access times of the L2 and L3 caches of the requesting node; $T_{PA\text{-}reqmsg}$ is the time needed to send a cache line request to the PA-home; $T_{DCDIR}$ is the time needed to access the data cache directory in the PA-home; and $T_{coh\_op}$ is the time needed to perform the coherence operations needed to load the requested cache line. The serial nature of these operations leads to latencies that can significantly impact the performance of small and large shared-memory server systems.

Embodiments of the present invention seek to reduce the serialization latency of combined TLB and data cache misses in a coherent shared-memory system with a shared last-level TLB by fusing (e.g., combining) TLB and cache misses.

4. Fusing TLB and Data Cache Misses

In some embodiments, a TLB-miss and a cache miss can be fused such that some of the latency of data coherence operations is overlapped with address translation and data cache access latencies. More specifically, a TLB miss and a subsequent cache miss are speculatively fused into a single coherence operation over a shared-memory system's coherence interconnect. Overlapping these latencies involves only minimal additional hardware (e.g., some additional hardware logic, but no additional cache structures), but can reduce data access latencies by hundreds of cycles.

In some embodiments, fusing a TLB miss and a data cache miss to reduce the overall critical path latency of linked TLB and data cache misses involves enhancing the virtual memory system of a shared-memory system. More specifically, to improve performance, a virtual memory system may benefit from being expanded to encompass and consider the notion and selection of an appropriate VA-home for a virtual page. In systems that do not support the notion of a VA-home, an operating system for a shared-memory system allocates a physical page (either locally to a given node, or remotely) and maps it to a virtual address without considering the locality between the virtual and physical pages. In contrast, in some embodiments the operating system can be enhanced to first try to allocate a physical page to a node that is also responsible for the virtual page to which the physical page will be mapped, thereby making the same node both the VA-home for the virtual address as well as the PA-home for the corresponding physical address. While locality-based mappings can improve performance by reducing the number of additional request messages that need to be sent, locality-based mapping is a performance optimization, and is not required for correctness; the operating system can instead perform a conventional mapping if such locality-based mapping is unavailable or is infeasible for a given memory allocation request (e.g., even an enhanced operating system may not guarantee locality-based mapping for every mapping). The following examples illustrate fused misses for scenarios where one node serves as both the VA-home and the PA-home as well as scenarios where different nodes serve as the VA-home and PA-home.

Figure 11:
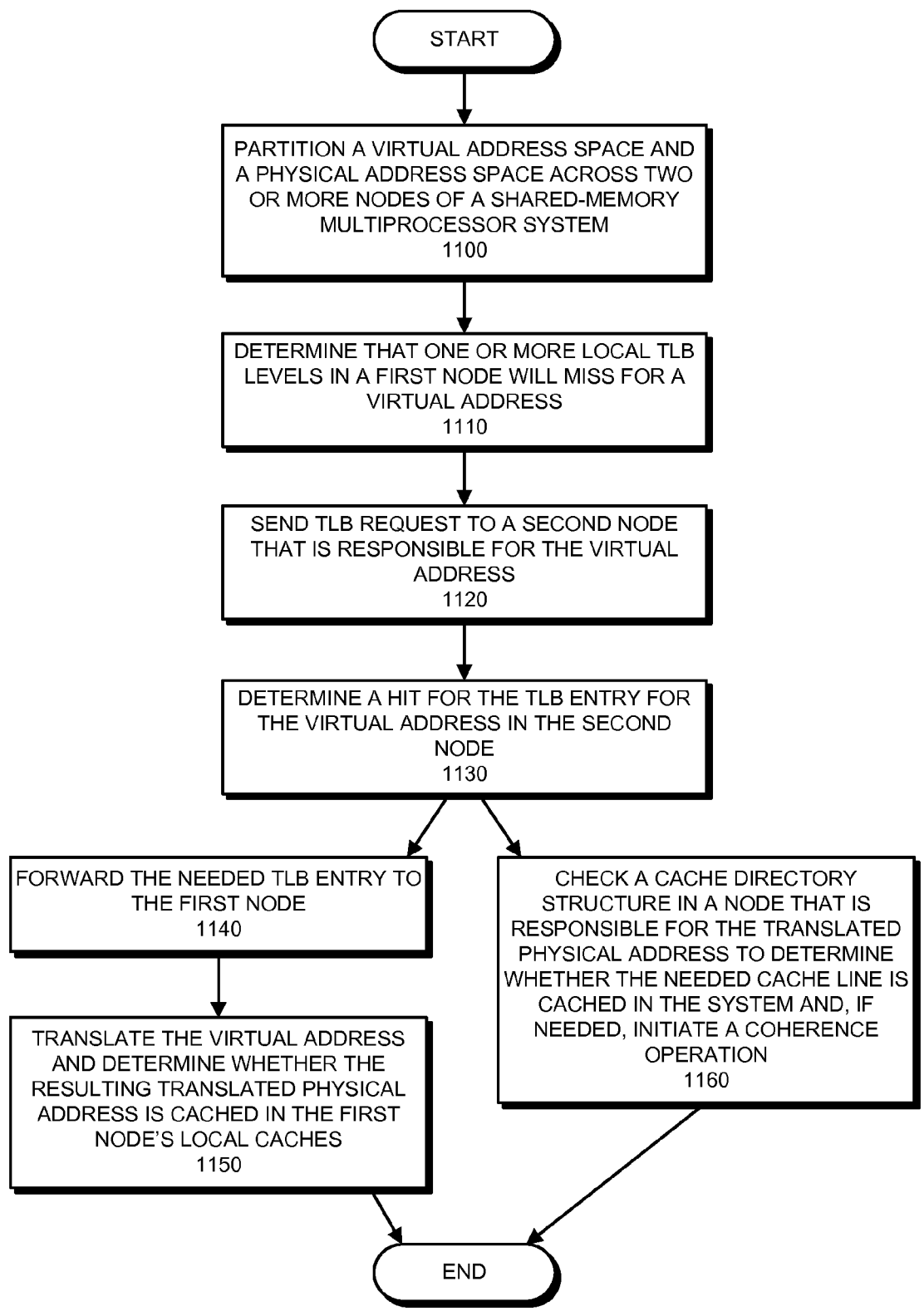
FIG. 11 presents a flow chart illustrating the process of fusing a shared last-level TLB miss and a subsequent cache miss into a single coherence operation in accordance with an embodiment.

FIG. 11 presents a flow chart that illustrates the process of fusing a shared last-level TLB miss and a subsequent cache miss into a single coherence operation. A shared-memory multiprocessor system partitions its virtual address space and its physical address space across two or more nodes (operation 1100). A last-level TLB structure in each node is responsible for the TLB entries for the node's subset of the virtual address space, with the last-level TLB structures of the nodes collectively forming a shared last-level TLB. During operation, a first node determines that one or more local TLB levels will miss for a virtual address (operation 1110). The first node sends a TLB request to a second node that is responsible for the subset of the virtual address space that is associated with the virtual address (operation 1120). Upon determining a hit for the TLB entry for the virtual address in the second node (operation 1130), the second node forwards the needed TLB to the first node (operation 1140), thereby allowing the first node to translate the virtual address into a physical address and determine whether the resulting translated physical address is cached in the first node's local caches (operation 1150). The second node also (in parallel with operations 1140-1150) initiates an operation to check whether a cache line associated with the translated physical address is available in the cache structures of any of the nodes. More specifically, the initiated operation (operation 1160) involves checking a cache directory structure in a node that is responsible for the translated physical address to determine whether the needed cache line is cached in the shared-memory multiprocessor system and, if needed, initiating a coherence operation. Determining the cache line state in parallel with forwarding the TLB entry (and looking up the translated physical address in the first node's local caches) reduces the latency of accessing the cache line if the translated physical address misses in the cache structures of the first node.

4.1 Fused Misses when the VA-home is also the PA-Home

Figure 12A:
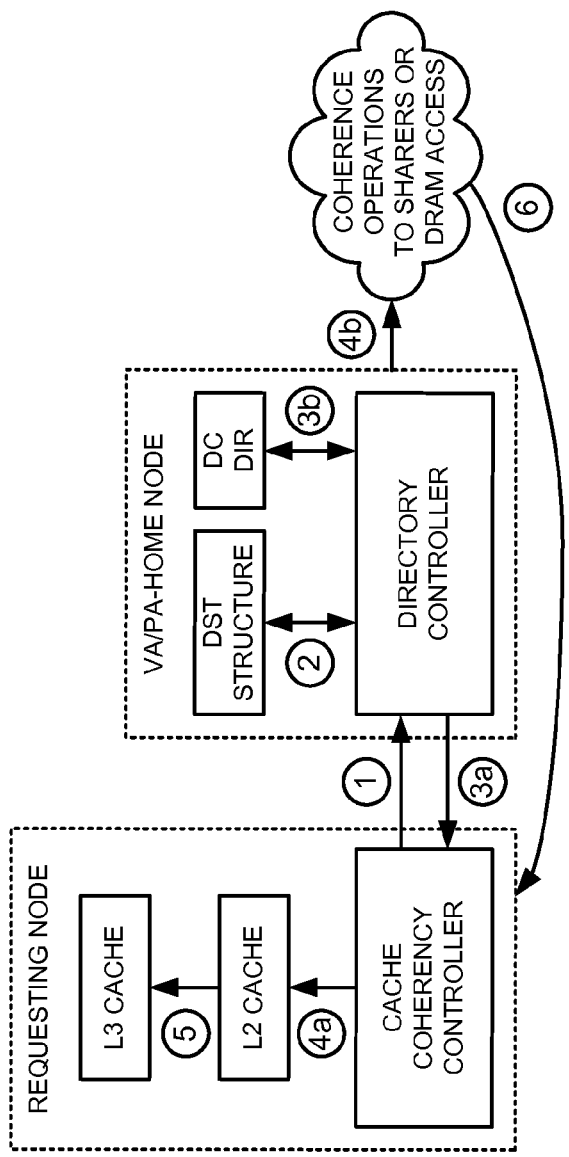
FIG. 12A illustrates the sequence of steps involved for fused TLB and cache misses in a coherent shared-memory system with a shared last-level TLB when a single node serves as both the VA-home and the PA-home for an associated pair of missing virtual and physical addresses in accordance with an embodiment.
Figure 12B:
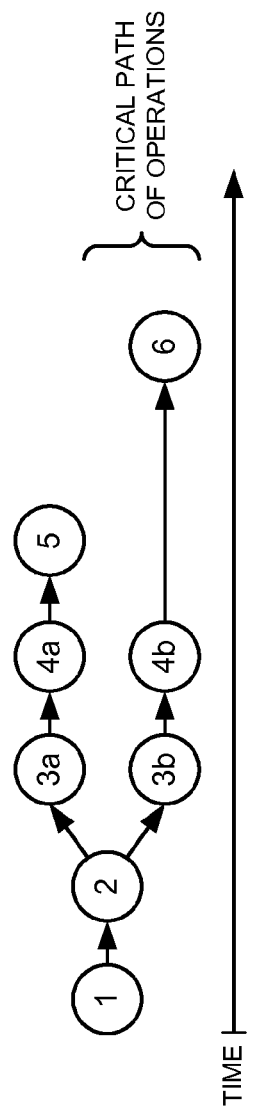
FIG. 12B illustrates the critical path timeline for the interactions of FIG. 12A in accordance with an embodiment.

FIGS. 12A-12B illustrate the sequence of steps involved for fused TLB and cache misses in a coherent shared-memory system with a shared last-level TLB when a single node serves as both the VA-home and the PA-home for an associated pair of missing virtual and physical addresses. FIG. 12A illustrates the interactions between nodes during two fused misses, while FIG. 12B illustrates a timeline of the critical path for these interactions. Note that, as in FIG. 10A, only the node components that are relevant to the current memory operation are illustrated in FIG. 12A.

In FIG. 12A, a requesting node experiences a TLB miss and subsequent related cache misses. As in FIG. 10A, the requesting node determines that none of its local TLBs includes the needed TLB entry, determines the VA-home node for the virtual address, and sends a translation request to the VA-home (operation 1). The directory controller on the VA-home node then retrieves the needed TLB entry from its DST structure (operation 2). Now, however, the VA-home node not only forwards the TLB entry to the requesting node (operation 3a), but also translates the virtual address in parallel, determines that it is also the PA-home node for the physical address, and speculatively checks its DC DIR to determine the status of the corresponding cache line (operation 3b). Hence, while the requesting node receives the TLB entry and attempts to access the needed physical address from its data cache hierarchy (operations 4a and 5), the fusion logic in the VA/PA-home is already initiating the appropriate coherence operations (operation 4b). Upon encountering an L3 miss in operation 5, the requesting node does not initiate another coherence operation, but instead just waits for the output of the coherence operation initiated by the VA/PA-home (operation 6). Note that if the cache line status in the DC DIR (of the VA/PA-home) indicates that the requesting node already has the needed cache line cached in its cache hierarchy (e.g., the scenario where the memory operation results in a TLB miss, but not a data cache miss), the directory controller of the VA/PA-home determines that it does not need to perform operations 4b and 6, and does not send any further response to the requesting node. Note also that if the needed TLB entry was not cached in the DST structure of the VA/PA-home node, the requesting node would be notified, and would perform a page-table walk, thereby changing the scenario slightly. However, upon receiving the TLB entry from the page-table walk, the requesting node would still forward the TLB entry to the VA/PA-home, at which point fusion logic in the VA/PA-home could proceed with the DC DIR lookup (and subsequent coherence operation) in parallel with the L2 and L3 cache accesses (operations 4a and 5) of the requesting node.

FIG. 12B illustrates the parallel paths for the fused lookups illustrated in FIG. 12A. The inter-node message (operation 3a) and the data cache accesses (operations 4a and 5) overlap with the DC DIR lookup (operation 3b), coherence operations (operation 4b), and response (operation 6). The resulting critical path latency, $$T_{critical} = T_{VA\text{-}reqmsg} + T_{DST} + T_{DCDIR} + T_{coh\_op},$$

eliminates four time components from the total latency described for FIG. 10B.

4.2 Fused Misses when the VA-Home is Distinct from the PA-Home

Figures 13A, 13B:
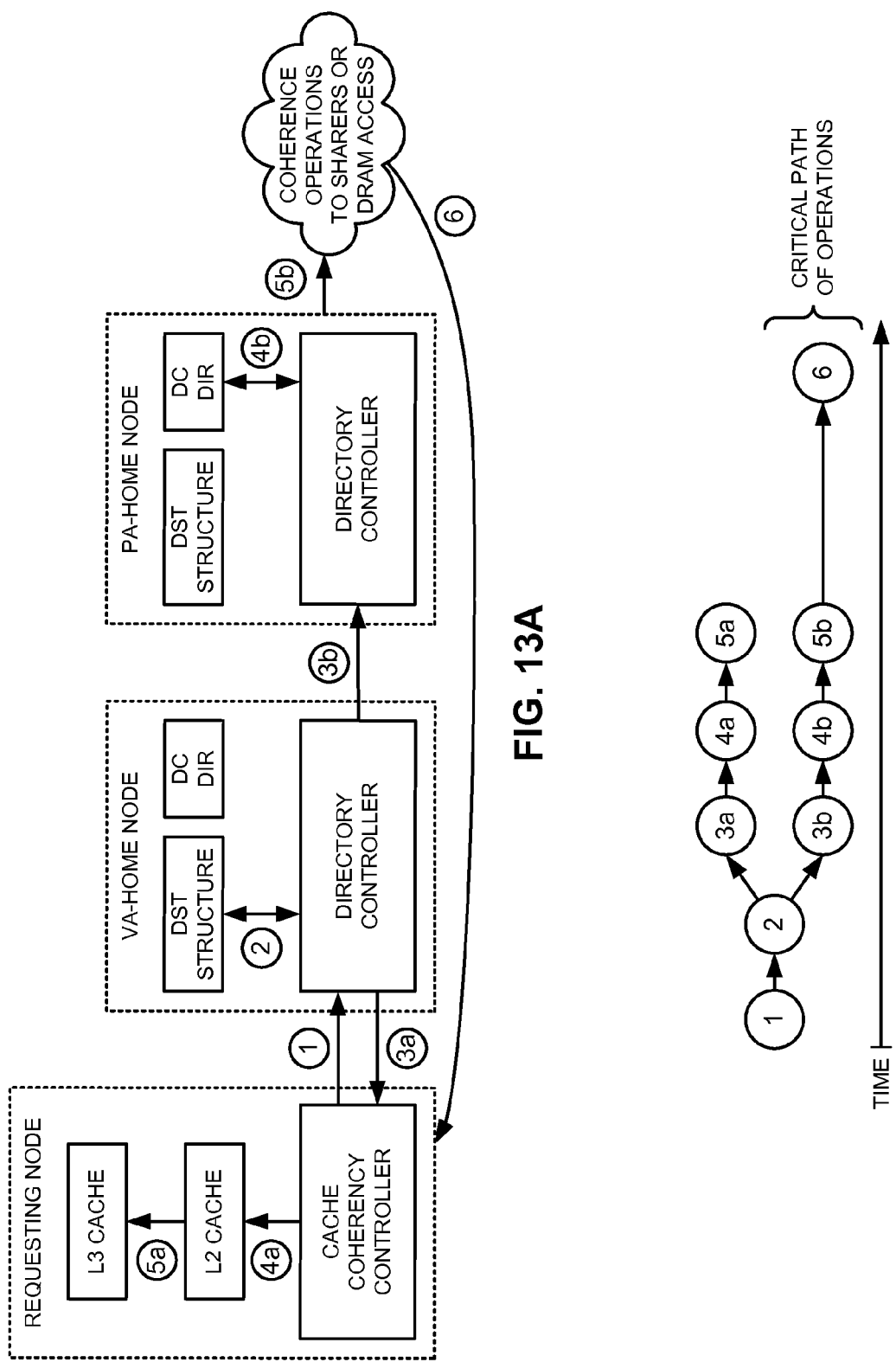
FIG. 13A illustrates the sequence of steps involved for fused TLB and cache misses in a coherent shared-memory system with a shared last-level TLB when separate nodes serve as the VA-home and the PA-home for an associated pair of missing virtual and physical addresses in accordance with an embodiment.
FIG. 13B illustrates the critical path timeline for the interactions of FIG. 13A in accordance with an embodiment.

FIGS. 13A-13B illustrate the sequence of steps involved for fused TLB and cache misses in a coherent shared-memory system with a shared last-level TLB when separate nodes serve as the VA-home and the PA-home for an associated pair of missing virtual and physical addresses. FIG. 13A illustrates the interactions between nodes during two fused misses, which are very similar to the preceding example. FIG. 13B illustrates a timeline of the critical path for these interactions. Note that, as in FIGS. 10A and 12A, only the node components that are relevant to the current memory operation are illustrated in FIG. 13A.

In FIG. 13A, a requesting node again determines that none of its local TLBs includes the needed TLB entry, determines the VA-home node for the virtual address, and sends a translation request to the VA-home (operation 1). The directory controller on the VA-home node then retrieves the needed TLB entry from its DST structure (operation 2). The VA-home node translates the virtual address in parallel with forwarding the TLB entry to the requesting node (operation 3a), but determines that (unlike in FIG. 12A) it is not the PA-home for the translated physical address, and so uses the translated physical address to determine the PA-home and forward a request for the translated physical address to the PA-home (operation 3b). Fusion logic in the PA-home speculatively checks its DC DIR to determine the status of the corresponding cache line (operation 4b) and initiates the appropriate coherence operations (operation 5b) while the requesting node receives the TLB entry and attempts to access the needed physical address from its data cache hierarchy (operations 4a and 5a). As described for FIG. 12A, upon encountering an L3 miss in operation 5a, the requesting node does not initiate another coherence operation, but instead just waits for the output of the coherence operation initiated by the VA/PA-home (operation 6). Note again (as described for FIG. 12A) that the PA-home does not need to perform any further actions if it determines from its DC DIR that the requesting node is already caching the needed cache line. Note also that if the requesting node needs to perform a page-table walk, it can forward the TLB entry to the VA-home and the translated physical address to the PA-home (where fusion logic can proceed with the DC DIR lookup and subsequent coherence operation, if needed, in parallel with the L2 and L3 cache accesses of the requesting node).

FIG. 13B illustrates the parallel paths for the fused lookups illustrated in FIG. 13A. The critical path is similar to that of FIG. 12B, but includes an additional message from the VA-home to the PA-home (operation 3b). An inter-node message (operation 3a) and the data cache accesses (operations 4a and 5a) overlap with another inter-node message (operation 3b), the DC DIR lookup (operation 4b), coherence operations (operation 5b), and response (operation 6). The resulting critical path latency is:

$$T_{critical} = T_{VA\text{-}reqmsg} + T_{DST} + T_{PA\text{-}reqmsg} + T_{DCDIR} + T_{coh\_op}.$$

The critical path equation for FIG. 10B shows eight latency components in a memory operation's critical path. In many scenarios the most time-intensive latency component is $T_{coh\_op}$, because it can involve a DRAM access and/or time-intensive coherency operations. However, given the long message latencies of switched interconnects in shared memory systems, removing two messages from the critical path along with L2/L3 accesses (as shown in the critical path equations for FIGS. 12B and 13B) can save hundreds of clock cycles. Note that the critical path equations described above assume a hit in a DST structure. A miss in the DST structure of the VA-home results in a similar set of operations (and latencies) as shown in the critical path equations of FIGS. 12B and 13B, with some additional latency from the requesting processor also resolving the virtual-to-physical mapping by performing a page-table walk and then forwarding the TLB entry and/or translated physical address to the VA-home and/or PA-home, respectively.

Note that while the examples of FIGS. 10A-10B and 12A-13B describe fused misses in the context of a coherent shared-memory system with a distributed shared last-level TLB (as described in section 2.1), substantially similar techniques can also be applied to coherent shared-memory systems with a directory-based shared last-level TLB (as described in section 2.2) and/or a range of other coherent shared-memory systems.

4.3 Benefits of Shared Last-Level TLBs

As described above, the disclosed techniques for fusing TLB and cache misses reduce the latency on the critical path of a memory operation by overlapping the latency of coherence operations with the latency of TLB-related messages and data cache operations. Specific advantages of these techniques include:
- reducing the latency of the critical cache miss path by hundreds of cycles;
- involving only logic changes to a shared-memory system with a shared last-level TLB—no additional cache structures are required;
- not requiring any application-level changes; and
- re-using and/or extending existing cache coherence hardware (interconnects, directories, etc.) to enable miss fusion capabilities.

Note that the described fusion techniques do involve executing a speculative check in the DC DIR of the PA-home. A subset of the requests (e.g., translated physical addresses not present in the caches of the requesting node) received by the PA-home would have eventually issued anyway. However, a subset of the requests issued to the PA-home will be for physical addresses that will hit in the L2 or L3 caches of the requesting node, and are thus spurious requests. However, the performance benefits of fusing misses justify the additional traffic to the data cache directories. Note also that fusing misses does not increase the number of DRAM accesses (e.g., the PA-home node still only initiates a DRAM access if it knows that none of the caches contains the needed cache line), and does not change the cache traffic in the requesting node (e.g., both caches will be checked in the requesting node regardless of whether fused misses are supported or not).

The described fusion techniques shorten the TLB miss critical path delay by reducing a missing node's need to complete two independent coherence operations into a single, fused coherence operation. Thus, these fusion techniques are distinct from other techniques that seek to improve performance by reducing the number of TLB misses. Note that the described fusion techniques also occur "on demand" during TLB misses, in contrast with pre-fetching techniques that need to perform additional tracking and suffer from bandwidth wastage due to false positives. Furthermore, these fusion techniques leverage existing cache coherence infrastructure and an existing shared last-level TLB, and do not involve the complex sharing metrics and prediction mechanisms that are required to determine when to share or push translations to other TLBs in some other techniques (e.g., in snooping-based techniques). Finally, although the described fusion techniques reduce the critical-path latency of TLB misses, the use of a shared last-level TLB can also improve TLB shoot-down performance. For instance, in a coherent shared-memory system with a shared last-level TLB that maintains a list of all page-table-entry sharers, only relevant cores need to be interrupted on a TLB shoot-down. Hence, the described techniques are independent of, and potentially beneficial to the performance of, TLB shoot-downs.

In summary, embodiments of the present invention provide techniques for reducing address-translation latency and the serialization latency of combined TLB and data cache misses in a coherent shared-memory system. For instance, the last-level TLB structures of two or more multiprocessor nodes can be configured to act together as either a distributed shared last-level TLB or a directory-based shared last-level TLB. Such TLB-sharing techniques increase the total amount of useful translations that are cached by the system, thereby reducing the number of page-table walks and improving performance. Furthermore, a coherent shared-memory system with a shared last-level TLB can be further configured to fuse TLB and cache misses such that some of the latency of data coherence operations is overlapped with address translation and data cache access latencies, thereby further improving the performance of memory operations.

5. Computing Environment

Figure 14:
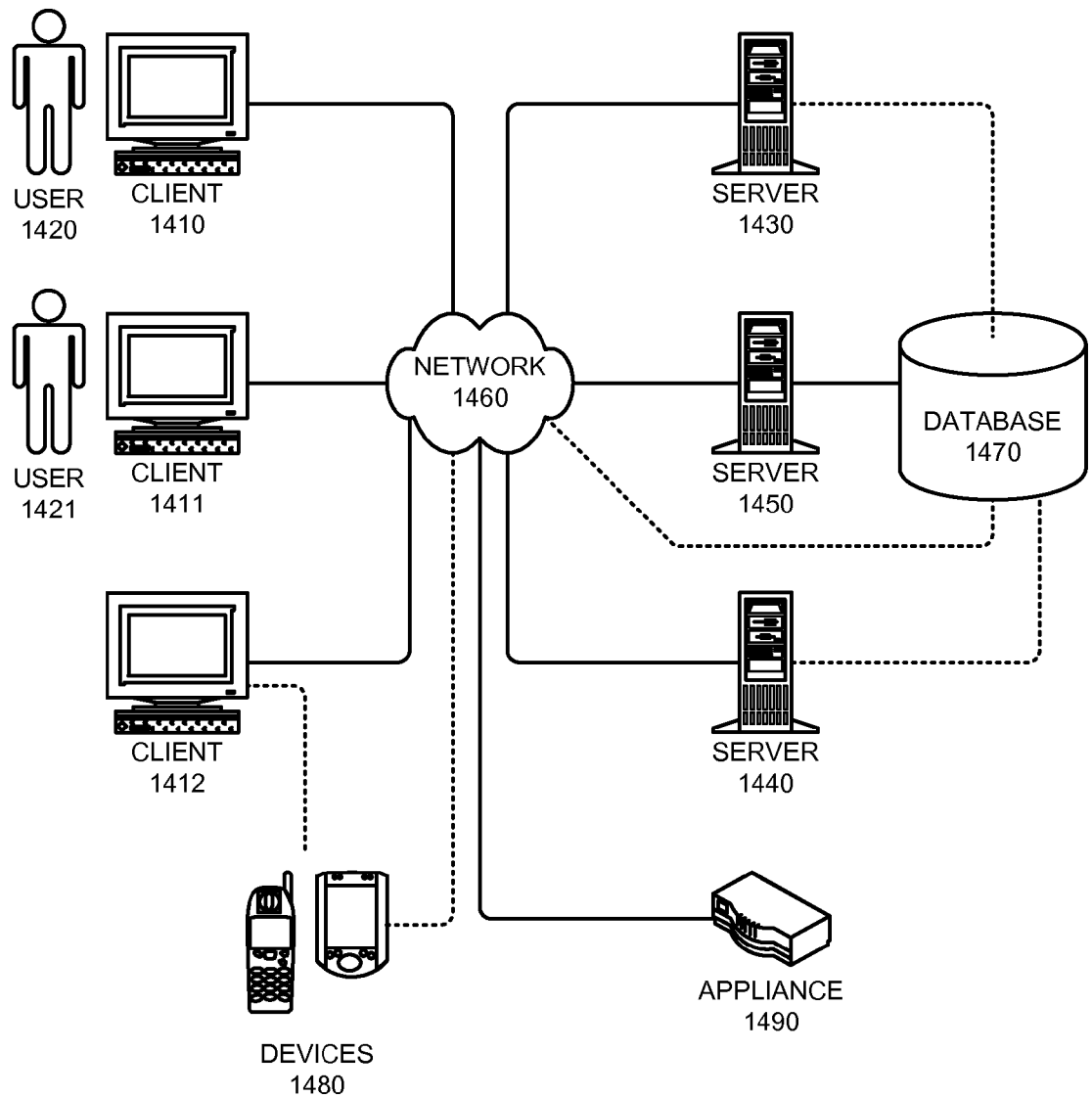
FIG. 14 illustrates a computing environment in accordance with an embodiment.

In some embodiments of the present invention, shared last-level TLB structures and techniques for fusing TLB and subsequent cache misses can be incorporated into a wide range of computing devices in a computing environment. For example, FIG. 14 illustrates a computing environment 1400 in accordance with an embodiment of the present invention. Computing environment 1400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 14, computing environment 1400 includes clients 1410-1412, users 1420 and 1421, servers 1430-1450, network 1460, database 1470, devices 1480, and appliance 1490.

Clients 1410-1412 can include any node on a network that includes computational capability and includes a mechanism for communicating across the network. Additionally, clients 1410-1412 may comprise a tier in an n-tier application architecture, wherein clients 1410-1412 perform as servers (servicing requests from lower tiers or users), and wherein clients 1410-1412 perform as clients (forwarding the requests to a higher tier).

Similarly, servers 1430-1450 can generally include any node on a network including a mechanism for servicing requests from a client for computational and/or data storage resources. Servers 1430-1450 can participate in an advanced computing cluster, or can act as stand-alone servers. For instance, computing environment 1400 can include a large number of compute nodes that are organized into a computing cluster and/or server farm. In one embodiment of the present invention, server 1440 is an online "hot spare" of server 1450. In other embodiments, servers 1430-1450 include coherent shared-memory multiprocessors.

Users 1420 and 1421 can include: an individual; a group of individuals; an organization; a group of organizations; a computing system; a group of computing systems; or any other entity that can interact with computing environment 1400.

Network 1460 can include any type of wired or wireless communication channel capable of coupling together computing nodes. This includes, but is not limited to, a local area network, a wide area network, or a combination of networks. In one embodiment of the present invention, network 1460 includes the Internet. In some embodiments of the present invention, network 1460 includes phone and cellular phone networks.

Database 1470 can include any type of system for storing data in non-volatile storage. This includes, but is not limited to, systems based upon magnetic, optical, or magneto-optical storage devices, as well as storage devices based on flash memory and/or battery-backed up memory. Note that database 1470 can be coupled: to a server (such as server 1450), to a client, or directly to a network.

Devices 1480 can include any type of electronic device that can be coupled to a client, such as client 1412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 1480 can be coupled directly to network 1460 and can function in the same manner as clients 1410-1412.

Appliance 1490 can include any type of appliance that can be coupled to network 1460. This includes, but is not limited to, routers, switches, load balancers, network accelerators, and specialty processors. Appliance 1490 may act as a gateway, a proxy, or a translator between server 1440 and network 1460.

Note that different embodiments of the present invention may use different system configurations, and are not limited to the system configuration illustrated in computing environment 1400. In general, any device that includes two or more processing nodes, a shared last-level TLB, one or more levels of caches, and a coherent memory-sharing architecture may incorporate elements of the present invention.

In some embodiments of the present invention, some or all aspects of shared last-level TLB structures and/or miss fusion logic can be implemented as dedicated hardware modules in a computing device. These hardware modules can include, but are not limited to, processor chips, application-specific integrated circuit (ASIC) chips, field-programmable gate arrays (FPGAs), memory chips, and other programmable-logic devices now known or later developed.

Note that a coherent shared-memory processor can include one or more specialized circuits for performing the operations of the above-described TLB-sharing and/or miss fusion techniques. Alternatively, some or all of the operations may be performed using general-purpose circuits that are configured using processor instructions. Also, while FIGS. 1-2, 4, and 6 illustrate a shared TLB mechanism and/or miss fusion logic as being internal to a processor, in alternative embodiments some or all of these mechanisms can be external to a processor.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer implemented method for using a shared last level TLB to reduce address-translation latency, wherein the method operates in a shared memory multiprocessor system which partitions TLB entries for a virtual address space across two or more nodes, wherein a last level TLB structure in each node is responsible for TLB entries for a subset of the virtual address space, and wherein the last level TLB structures of the nodes collectively form the shared last level TLB, the method comprising:
   receiving a memory operation that includes a virtual address;
   upon determining that one or more TLB levels in a first node will miss for the virtual address:
       sending a TLB request to a second node associated with the virtual address, wherein the last level TLB structure in the second node is responsible for a subset of the virtual address space that includes the virtual address, wherein the subset includes some but not all of the virtual address space; and
       scheduling a speculative page table walk for the virtual address;
   upon receiving the TLB request, determining, at the last level TLB structure of the second node, whether the TLB entry for the virtual address is being cached by the shared last level TLB;
   upon determining that the TLB entry for the virtual address is being cached by the shared last level TLB:
       sending the TLB entry for the virtual address to the first node; and
       canceling the speculative page table walk;
   otherwise, upon determining that the TLB entry for the virtual address is not being cached by the shared last level TLB, waiting for speculative page table walk to complete.

2. The computer implemented method of claim 1,
   wherein the shared last level TLB is a distributed shared last level TLB;
   wherein the last level TLB structure in each node caches TLB entries for virtual addresses in the portion of the virtual address space allocated to the given node; and
   wherein the last level TLB structure in the second node directly caches TLB entries for the portion of the virtual address space that includes the virtual address.

3. The computer implemented method of claim 2, wherein the last level TLB structure for a node acts as a last level TLB, but directly caches only TLB entries for virtual addresses in the portion of the virtual address space partitioned to the given node and does not cache TLB entries for virtual addresses outside the portion of the virtual address space partitioned to the given node, wherein the portion of the virtual address space partitioned to the given node includes some but not all of the virtual address space.

4. The computer implemented method of claim 3, wherein a lookup for the virtual address misses in the last level TLB structure of the second node, and wherein the method further comprises:
   receiving a translation for the virtual address from the speculative page table walk; and
   forwarding the translation information for the virtual address to the last level TLB structure of the second node.

5. The computer implemented method of claim 4, wherein the last level TLB structure replaces an existing last level TLB for a node, and hence does not require additional directory structures.

6. The computer implemented method of claim 1,
   wherein the shared last level TLB is a directory based shared last level TLB;
   wherein the last level TLB structure for a given node includes a TLB directory which tracks the set of nodes which are currently caching TLB entries for virtual addresses in the portion of the virtual address space allocated to the given node; and
   wherein the TLB directory of the second node facilitates identifying one or more nodes that are caching the TLB entry for the virtual address.

7. The computer implemented method of claim 6, wherein the method further comprises:
   using the TLB directory of the second node to forward the TLB request to a sharing node that is currently caching the TLB entry for the virtual address; and
   sending the TLB entry for the TLB request from the sharing node to the first node.

8. The computer implemented method of claim 6, wherein the method further comprises:
   using the TLB directory of the second node to determine that no node is currently caching the TLB entry associated with the virtual address;
   receiving translation information for the virtual address from the speculative page table walk; and
   updating the TLB directory of the second node to indicate that the first node is caching the TLB entry for the virtual address.

9. The computer implemented method of claim 1,
   wherein the nodes of the shared last level TLB use existing memory coherence networks to share TLB entries; and
   wherein the shared last level TLB facilitates increasing the total number of TLB entries that are simultaneously cached by the shared memory multiprocessor system.

10. A shared memory multiprocessor system that reduces address translation latency, comprising:
    a first node;
    a second node; and
    a coherence network that facilitates communication between the first node and the second node;
    wherein the TLB entries for a virtual address space are partitioned across the two or more nodes of the shared memory multiprocessor system;
    wherein a last level TLB structure in each node is responsible for TLB entries for a subset of the virtual address space that includes some but not all of the virtual address space, and wherein the last level TLB structures of the nodes collectively form a shared last level TLB;
    wherein, upon determining that one or more TLB levels in the first node will miss for a virtual address and that the last level TLB structure in the second node is responsible for a subset of the virtual address space that includes the virtual address, the first node is configured to:
send a TLB request to the second node; and
schedule a speculative page table walk for the virtual address; and
wherein, upon receiving the TLB request, the last level TLB structure of the second node is configured to determine whether the TLB entry for the virtual address is being cached by the shared last level TLB;
wherein, upon determining that the TLB entry for the virtual address is being cached by the shared last level TLB:
the second node is configured to cause the TLB entry for the virtual address to be sent to the first node; and
the first node is configured to cancel the speculative page table walk; and
wherein otherwise, upon determining that the TLB entry for the virtual address is not being cached by the shared last level TLB, the first node is configured to wait for speculative page table walk to complete.

11. The shared memory multiprocessor system of claim 10, wherein the shared last level TLB is a distributed shared last level TLB;
wherein the last level TLB structure in each node caches TLB entries for virtual addresses in the portion of the virtual address space allocated to the given node; and
wherein the last level TLB structure in the second node directly caches TLB entries for the portion of the virtual address space that includes the virtual address.

12. The shared memory multiprocessor system of claim 11, wherein the last level TLB structure for a node acts as a last level TLB, but directly caches only TLB entries for virtual addresses in the portion of the virtual address space partitioned to the given node and does not cache TLB entries for virtual addresses outside the portion of the virtual address space partitioned to the given node, wherein the portion of the virtual address space partitioned to the given node includes some but not all of the virtual address space.

13. The shared memory multiprocessor system of claim 12, wherein a lookup for the virtual address misses in the last level TLB structure of the second node;
wherein the first node receives a translation for the virtual address from the speculative page table walk; and
wherein the first node is configured to forward the translation information for the virtual address to the last level TLB structure of the second node.

14. The shared memory multiprocessor system of claim 13, wherein the last level TLB structure replaces an existing last level TLB for a node, and hence does not require additional directory structures.

15. The shared memory multiprocessor system of claim 10, wherein the shared last level TLB is a directory based shared last level TLB;
wherein the last level TLB structure for a given node includes a TLB directory which tracks the set of nodes which are currently caching TLB entries for virtual addresses in the portion of the virtual address space allocated to the given node; and
wherein the TLB directory of the second node facilitates identifying one or more nodes that are caching the TLB entry for the virtual address.

16. The shared memory multiprocessor system of claim 15, wherein the shared memory multiprocessor system further comprises a sharing node;
wherein the second node is configured to use its TLB directory to determine if any nodes of the shared memory multiprocessor system are currently caching the TLB entry for the virtual address;
wherein the second node is further configured to, upon determining that the sharing node is caching the TLB entry, forward the TLB request to the sharing node; and
wherein the sharing node is configured to send the TLB entry for the TLB request to the first node upon receiving the request from the second node.

17. The shared memory multiprocessor system of claim 15, wherein the second node is further configured to, upon determining that no node in the shared memory multiprocessor is caching the TLB entry:
receive translation information for the virtual address from the speculative page table walk; and
update the TLB directory of the second node to indicate that the first node is caching the TLB entry for the virtual address.

18. The shared memory multiprocessor system of claim 10, wherein the nodes of the shared last level TLB use existing memory coherence networks to share TLB entries; and
wherein the shared last level TLB facilitates increasing the total number of TLB entries that are simultaneously cached by the shared memory multiprocessor system.

19. A last level TLB structure that reduces address-translation latency, comprising:
a set of directory structures for caching TLB entries;
wherein the last level TLB structure is included in a given node of a shared memory multiprocessor system and the last level TLB structures of two or more nodes of the shared memory multiprocessor system collectively form a shared last level TLB, with the TLB entries for a virtual address space being partitioned across the two or more nodes;
wherein the last level TLB structure is responsible for TLB entries for a subset of the virtual address space that includes some but not all of the virtual address space, and;
wherein the last level TLB structure receives a TLB request for a virtual address from a requesting node, wherein TLB lookups for the virtual address have missed in one or more TLB levels of the requesting node, wherein the subset includes the virtual address, and wherein the requesting node sent the TLB request to the last level TLB structure in parallel with scheduling a speculative page table walk for the virtual address;
wherein the last level TLB structure is configured to determine from the set of directory structures whether a TLB entry for the virtual address is being cached by the shared last level TLB; and
wherein, if the last level TLB structure determines that the TLB entry is being cached by the shared last level TLB, the last level TLB structure is configured to ensure that the TLB entry for the virtual address is sent to the requesting node and to communicate that the requesting node should cancel the speculative page table walk.
wherein otherwise, when the last level TLB structure determines that the TLB entry is not being cached by the shared last level TLB, the first node is configured to wait for speculative page table walk to complete.

20. The last level TLB structure of claim 19, wherein the last level TLB structure for given node acts as a last level TLB, but directly caches only TLB entries for virtual addresses in the portion of the virtual address space partitioned to the given node and does not cache TLB entries for virtual addresses outside the portion of the virtual address space partitioned to the given node, wherein the portion of the virtual address space partitioned to the given node includes some but not all of the virtual address space.

* * * * *

UNITED STATES PATENT AND TRADEMARK OFFICE
CERTIFICATE OF CORRECTION

Page 1 of 1

PATENT NO. : 9,081,706 B2
APPLICATION NO. : 13/468904
DATED : July 14, 2015
INVENTOR(S) : Pranay Koka et al.

It is certified that error appears in the above-identified patent and that said Letters Patent is hereby corrected as shown below:

In the Claims

In claim 19 (at column 22, line 47 Approximately) delete the term "TLB; and" and replace it with the term -- TLB; --

In claim 19 (at column 22, line 53 Approximately) delete "walk" and insert the following in its place: -- walk; and --

Signed and Sealed this
Fifth Day of April, 2016

Michelle K. Lee
*Director of the United States Patent and Trademark Office*